United States Patent
Mizuno

(10) Patent No.: US 10,449,778 B2
(45) Date of Patent: Oct. 22, 2019

(54) FILTER UNIT, LIQUID JETTING MODULE, AND LIQUID JETTING HEAD

(71) Applicant: BROTHER KOGYO KABUSHIKI KAISHA, Nagoya-shi, Aichi-ken (JP)

(72) Inventor: Taisuke Mizuno, Yokkaichi (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 28 days.

(21) Appl. No.: 15/711,949

(22) Filed: Sep. 21, 2017

(65) Prior Publication Data

US 2018/0117924 A1 May 3, 2018

(30) Foreign Application Priority Data

Oct. 31, 2016 (JP) .................................. 2016-212524

(51) Int. Cl.
 *B41J 2/19* (2006.01)
 *B01D 35/30* (2006.01)
 *B41J 2/175* (2006.01)
 *B41J 2/14* (2006.01)

(52) U.S. Cl.
 CPC ................ *B41J 2/19* (2013.01); *B01D 35/30* (2013.01); *B41J 2/14* (2013.01); *B41J 2/17563* (2013.01); *B01D 2201/302* (2013.01); *B41J 2002/14403* (2013.01)

(58) Field of Classification Search
 None
 See application file for complete search history.

(56) References Cited

U.S. PATENT DOCUMENTS

| | | | | |
|---|---|---|---|---|
| 6,120,140 A | * | 9/2000 | Hirosawa | B41J 2/17563 347/93 |
| 8,882,254 B2 | * | 11/2014 | Von Essen | B41J 2/185 347/92 |
| 2006/0201870 A1 | | 9/2006 | Seto et al. | |
| 2007/0109365 A1 | | 5/2007 | Okuda | |
| 2011/0279607 A1 | * | 11/2011 | Yamamoto | B41J 2/14024 347/93 |
| 2019/0016148 A1 | * | 1/2019 | Akahane | B41J 2/17563 |

FOREIGN PATENT DOCUMENTS

JP 2006-248058 A 9/2006
JP 4910368 B2 4/2012

\* cited by examiner

*Primary Examiner* — Benjamin M Kurtz
(74) *Attorney, Agent, or Firm* — Merchant & Gould P.C.

(57) ABSTRACT

A filter unit includes: a liquid chamber forming member having a liquid inlet port, a liquid outlet port, and a liquid chamber communicating with the liquid inlet port and the liquid outlet port; and a filter disposed in the liquid chamber such that a surface direction of the filter lies along an up-down direction, the filter extending to an upper end of the liquid chamber to divide the liquid chamber into an upstream chamber communicating with the liquid inlet port and a downstream chamber communicating with the liquid outlet port. A discharge port joined to the liquid outlet port is disposed in an upper end portion of the downstream chamber at a central portion in a width direction orthogonal to the up-down direction, and the liquid chamber forming member has two first side wall surfaces sandwiching the discharge port in the width direction.

19 Claims, 20 Drawing Sheets

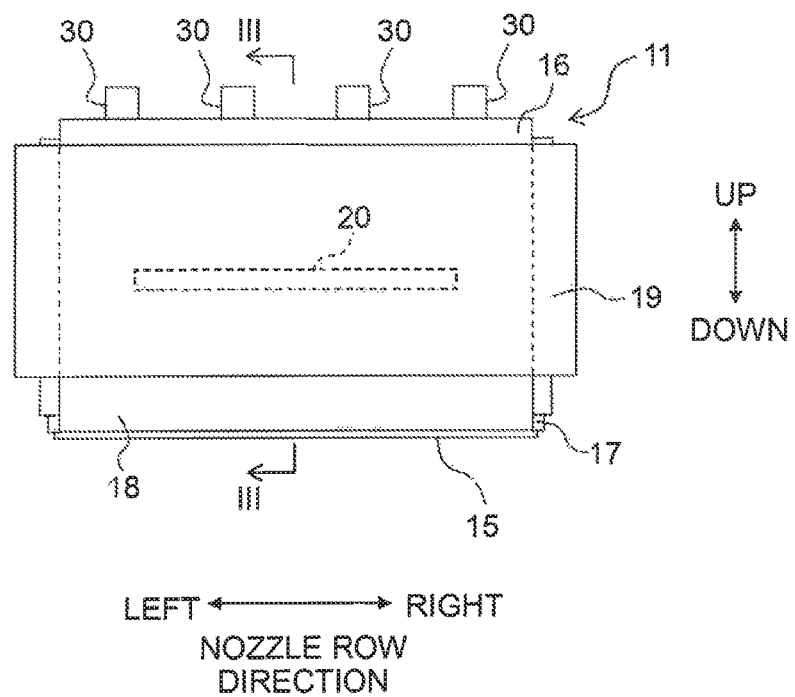

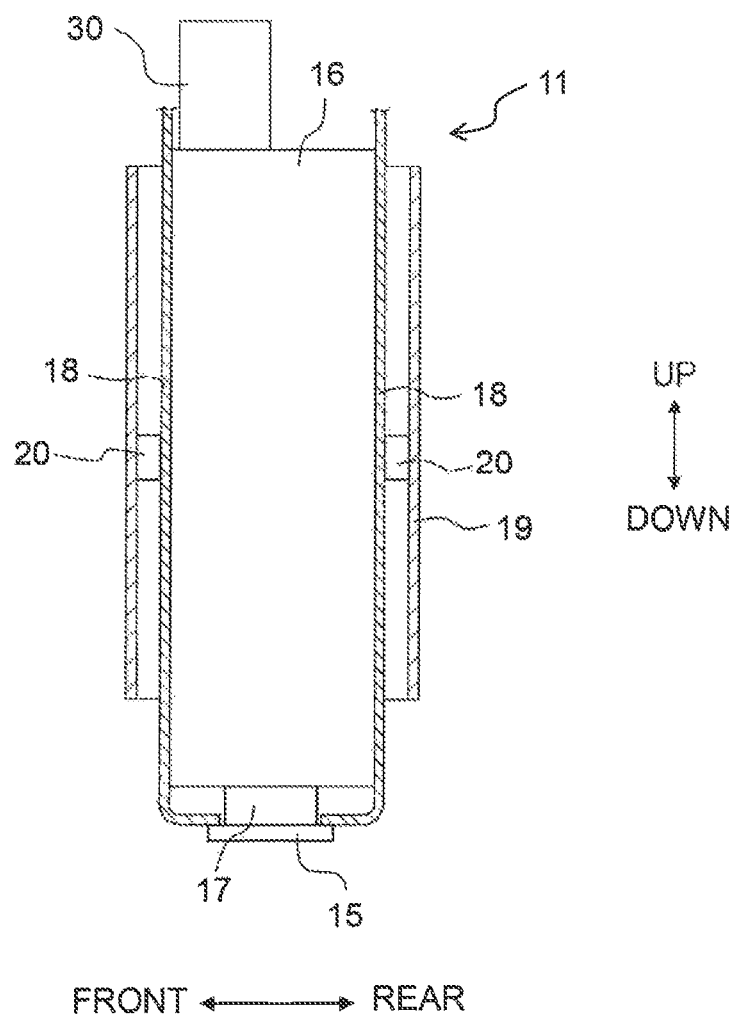

RIGHT ←——→ LEFT
NOZZLE ROW
DIRECTION

RIGHT ←——→ LEFT
NOZZLE ROW
DIRECTION

RIGHT ←→ LEFT
NOZZLE ROW
DIRECTION
(FILTER WIDTH DIRECTION)

FRONT ←→ REAR

LEFT ←——→ RIGHT
NOZZLE ROW DIRECTION
(FILTER WIDTH DORECTION)

FRONT ←——→ REAR

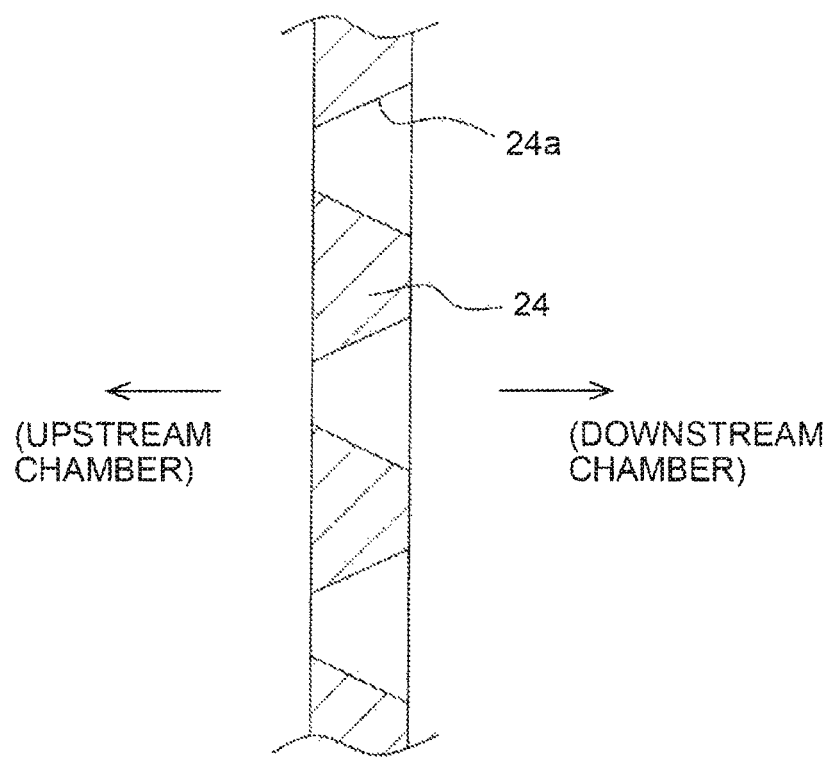

LEFT ←→ RIGHT
NOZZLE ROW DIRECTION
(FILTER WIDTH DORECTION)

LEFT ←→ RIGHT
NOZZLE ROW
DIRECTION

Fig. 19A
(K CROSS SECTION)
Fig. 19B
(YCM CROSS SECTION)
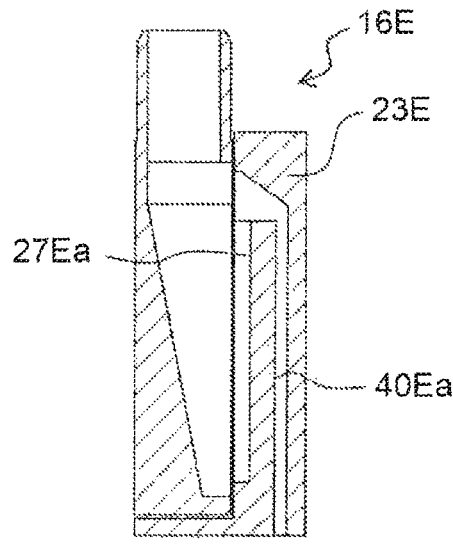
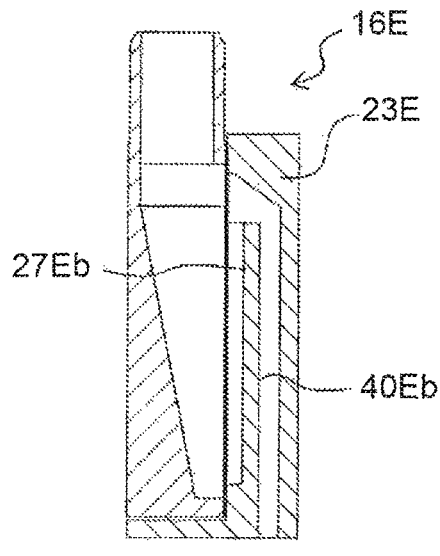
FRONT ←→ REAR
FRONT ←→ REAR
Fig. 20
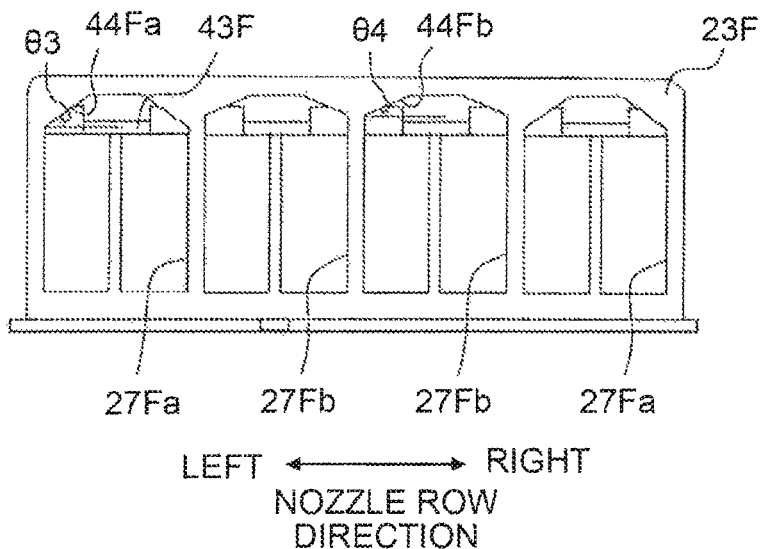
LEFT ←→ RIGHT
NOZZLE ROW DIRECTION (END SIDE LIQUID CHAMBER)

(CENTRAL SIDE LIQUID CHAMBER)

FILTER UNIT, LIQUID JETTING MODULE, AND LIQUID JETTING HEAD

CROSS REFERENCE TO RELATED APPLICATION

The present application claims priority from Japanese Patent Application No. 2016-212524 filed on Oct. 31, 2016, the disclosures of which is incorporated herein by reference in its entirety.

BACKGROUND

Field of the Invention

The present invention relates to a filter unit, a liquid jetting module, and a liquid jetting head.

Description of the Related Art

A filter unit for an ink-jet recording apparatus is known from the past. This filter unit is disposed between an ink-jet head and an ink cartridge. By means of a filter on an inside of the filter unit, the filter unit captures contaminants in ink flowing from the ink cartridge, and suppresses the contaminants flowing to the ink-jet head.

For example, a conventional filter unit includes: a case main body having a liquid chamber formed therein; and a filter disposed in the liquid chamber in a posture that a surface direction of the filter will be an up-down direction. The liquid chamber in the case main body is partitioned into a first liquid chamber and a second liquid chamber by the filter.

In particular, regarding the second liquid chamber more on a downstream side than the filter, an ink chamber outlet port is provided in an upper end section of the second liquid chamber. In more detail, the ink chamber outlet port is provided in the upper end section of the second liquid chamber at an end portion in a width direction of the filter. This ink chamber outlet port is joined to an outflow port provided in a case main body lower end.

SUMMARY

Incidentally, an air bubble mixed into the ink sometimes collects in the liquid chamber in the above-described filter unit. If use is continued with the air bubble staying unchanged in the liquid chamber, there is a risk that the air bubble grows whereby ink supply to the downstream side of the filter unit is hindered. Moreover, there is also a risk that the air bubble that has grown in the liquid chamber suddenly flows out to the downstream side and causes an operation malfunction of a downstream side apparatus (for example, the ink-jet head, and so on). Therefore, the liquid chamber of the filter unit preferably adopts a structure that can improve dischargeability of air bubbles and in which it is difficult for an air bubble to stay.

In this regard, since the above-described conventional filter unit has its ink chamber outlet port positioned in the upper end section in the second liquid chamber on a filter downstream side, it becomes easy in the above-described conventional filter unit for an air bubble in the liquid chamber to be discharged from the upwardly-positioned ink chamber outlet port. However, dischargeability of air bubbles is insufficient simply by this configuration. That is, in the case that an air bubble has collected in a portion where flow speed of liquid is locally low, such as a corner in the second liquid chamber, it is difficult to reliably discharge the above-described air bubble by a structure simply having the ink chamber outlet port located in the upper end section of the second liquid chamber.

An object of the present teaching is to increase air bubble dischargeability from a liquid chamber on a filter downstream side.

According to an aspect of the present teaching, there is provided a filter unit including: a liquid chamber forming member having a liquid inlet port, a liquid outlet port, and a liquid chamber communicating with the liquid inlet port and the liquid outlet port; and a filter disposed in the liquid chamber in a posture that a surface direction of the filter lies along an up-down direction, the filter extending to an upper end of the liquid chamber, the filter dividing the liquid chamber into an upstream chamber communicating with the liquid inlet port and a downstream chamber communicating with the liquid outlet port, wherein a discharge port joined to the liquid outlet port is disposed in an upper end portion of the downstream chamber at a central portion in a width direction that is along the surface direction of the filter and orthogonal to the up-down direction, the liquid chamber forming member has two first side wall surfaces sandwiching the discharge port in the width direction, as wall surfaces forming the upper end portion of the downstream chamber, each of the two first side wall surfaces inclines with respect to the up-down direction to come closer to the discharge port upwardly, and a flow path width of the upper end portion of the downstream chamber in the width direction gradually decreases upwardly.

BRIEF DESCRIPTION OF THE DRAWINGS

FIG. 2 is a side view of an ink jet module.

FIG. 3 is a cross-sectional view taken along the line of the ink jet module of FIG. 2.

FIG. 13 is an enlarged cross-sectional view of a part of a filter.

FIG. 19A is a cross-sectional view of a filter unit of modified example 5 depicting a cross section of a black ink liquid chamber, and FIG. 19B is a cross-sectional view of the filter unit of modified example 5 depicting a cross section of a color ink liquid chamber.

FIG. 20 is a view of a downstream member of modified example 6 seen from its front side.

DESCRIPTION OF THE EMBODIMENTS

Figure 1:
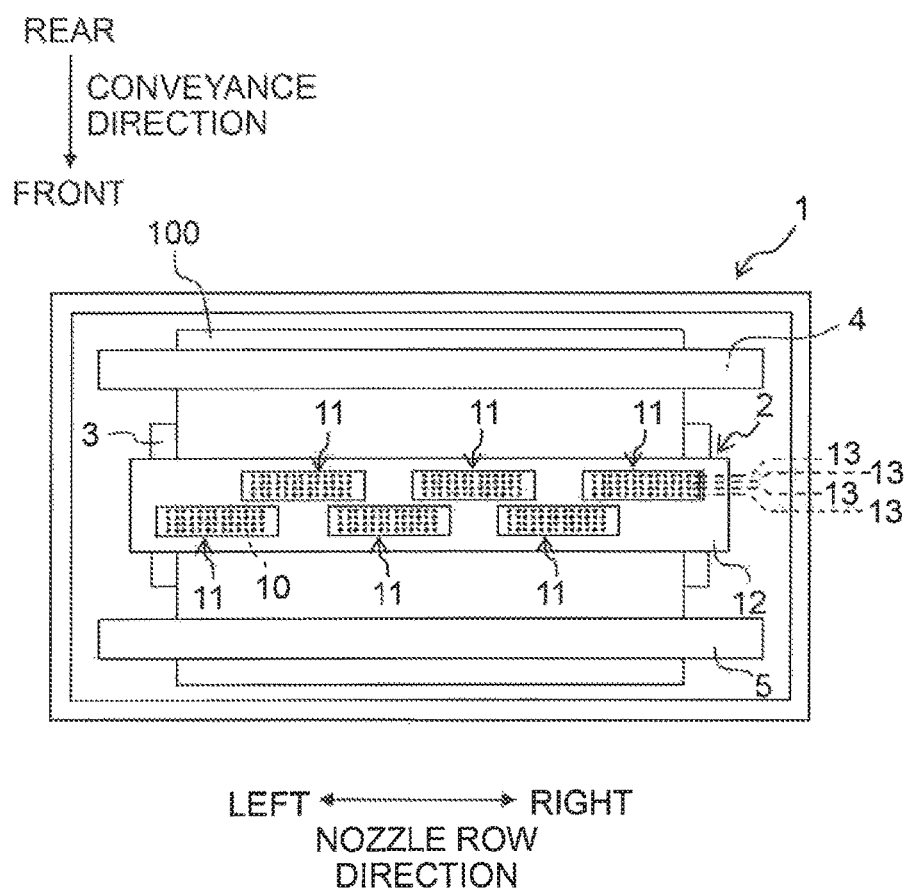
FIG. 1 is a schematic plan view of a printer according to the present embodiment.

An embodiment of the present teaching will be described. First, a schematic configuration of an ink-jet printer 1 will be described with reference to FIG. 1. Note that a direction in which a recording sheet 100 is conveyed in FIG. 1 is defined as a front-rear direction of the printer 1. Moreover, a width direction of the recording sheet 100 is defined as a left-right direction of the printer 1. Furthermore, a direction perpendicular to the paper surface of FIG. 1 and orthogonal to the front-rear direction and the left-right direction is defined as an up-down direction of the printer 1.

As depicted in FIG. 1, the printer 1 includes an ink-jet head 2, a platen 3, conveyance rollers 4, 5, and so on.

The ink-jet head 2 is a so-called line head that extends in the left-right direction over an entire width of the recording sheet 100. The ink-jet head 2 includes six ink jet modules 11 held in a holding member 12.

Each of the ink jet modules 11 has on its lower surface a plurality of nozzles 10 arranged in the left-right direction. The plurality of nozzles 10 configure four nozzle rows 13 aligned to front and rear. Four colors of inks (for example, black, yellow, cyan, magenta) are supplied from unillustrated ink tanks to each of the ink jet modules 11. That is, one ink jet module 11 respectively discharges the above-described four colors of inks from the four nozzle rows 13.

The six ink jet modules 11 are disposed divided three each to front and rear. Moreover, positions in the left-right direction are misaligned for the three ink jet modules 11 on a front side and the three ink jet modules 11 on a rear side, such that an ink jet module 11 on the front side is positioned between two ink jet modules 11 on the rear side. That is, the six ink jet modules 11 are disposed in a zigzag manner along the left-right direction. Moreover, fellow end sections in a nozzle row direction overlap in the front-rear direction between two ink jet modules 11, such that an arrangement of the nozzles 10 in the left-right direction is never discontinued between the ink jet modules 11 on the front side and the ink jet modules 11 on the rear side.

In a line head having a large number of nozzles 10 arranged in the width direction of the recording sheet 100, if a large number of nozzles or flow path portions communicating with the nozzles are formed in a single head, it is difficult for positional accuracy or dimensional accuracy to be suppressed below a standard for all of those nozzles and so on, and yield worsens. That is, the larger the number of nozzles is, the higher a probability of occurrence of nozzles or flow path portions not satisfying the above-described accuracy is. In this regard, when a line head is configured by combining a plurality of ink jet modules 11, the number of nozzles 10 becomes less in each of the ink jet modules 11, whereby it is comparatively easy for a line head satisfying the above-described accuracy to be made, hence an improvement in yield may be expected.

The platen 3 is disposed on a lower side of the ink-jet head 2. The conveyance rollers 4, 5 are respectively disposed to the front of and to the rear of the platen 3. The conveyance rollers 4, 5 convey the recording sheet 100 frontwards above the platen 3.

<Configuration of Ink Jet Module>

Next, a configuration of the ink jet module 11 will be described with reference to FIGS. 2 and 3. The ink jet module 11 includes a jetting unit 15, a filter unit 16, a distribution unit 17, a COF (Chip On Film) 18, and a heat sink 19.

The above-mentioned plurality of nozzles 10 are formed on a lower surface of the jetting unit 15. Moreover, the jetting unit 15 includes an actuator (illustration of which is omitted) that discharges ink individually from the plurality of nozzles 10. A configuration of the actuator is not particularly limited, but a piezoelectric actuator including a plurality of piezoelectric elements corresponding to the plurality of nozzles 10 may be suitably employed.

The filter unit 16 is disposed above the jetting unit 15. The filter unit 16 has four ink supply sections 30 in its upper section. Each of the ink supply sections 30 is connected to the unillustrated ink tank by a tube. Moreover, although mentioned in detail later, the filter unit 16 includes: four liquid chambers 25 respectively communicating with the four ink supply sections 30; and a filter 24 (refer to FIGS. 5 and 6). Contaminants included in ink supplied from the ink tank is captured by the filter 24 within the liquid chamber 25. As a result, the contaminants is prevented from flowing into the jetting unit 15, whereby a discharge defect is prevented from occurring in the nozzle 10.

The distribution unit 17 is disposed between the filter unit 16 and the jetting unit 15. This distribution unit 17 includes distribution flow paths (illustration of which is omitted) respectively corresponding to the four colors and extending in the nozzle row direction. Each of the colors of inks supplied from the filter unit 16 is distributed to the plurality of nozzles 10 configuring the nozzle row 13 by the distribution flow paths within the distribution unit 17.

Two of the COFs 18 are connected to the actuator of the jetting unit 15. Each of the COFs 18 is mounted with a driver IC 20 that drives the actuator. The two COFs 18 connected to the jetting unit 15 are each bent upwardly to respectively extend upwardly along a front surface and a rear surface of the filter unit 16, and are each connected to an unillustrated control board. Based on a control signal sent from the control board, the driver IC 20 outputs to the actuator a drive signal for discharging ink from the nozzle 10. The driver ICs 20 of the two COFs 18 contact the heat sink disposed in a periphery of the filter unit 16.

<Details of Filter Unit>

Next, a detailed configuration of the filter unit 16 will be described with reference to FIGS. 4 to 12. The filter unit 16 is a substantially rectangular parallelepiped shaped structure which is long in the nozzle row direction of the jetting unit 15. In more detail, the filter unit 16 includes: a liquid chamber forming member 21 configured from an upstream member 22 and a downstream member 23; and the filter 24.

Figure 4A:
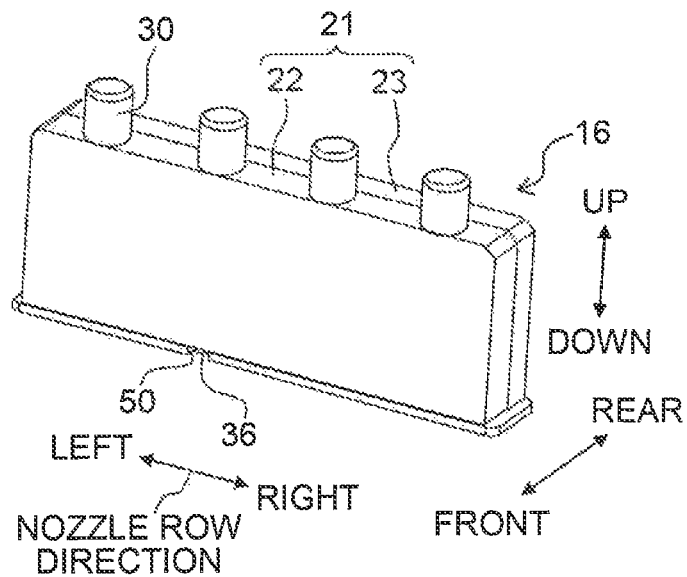
FIG. 4A is a perspective view of a filter unit seen from a front obliquely upward direction.
Figure 5:
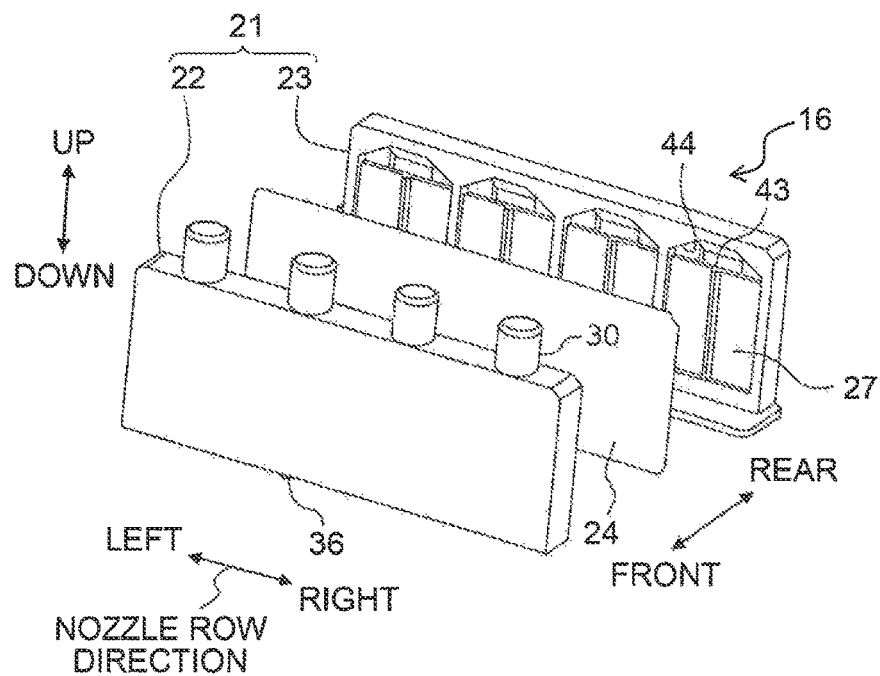
FIG. 5 is an exploded perspective view of the filter unit.
Figure 6:
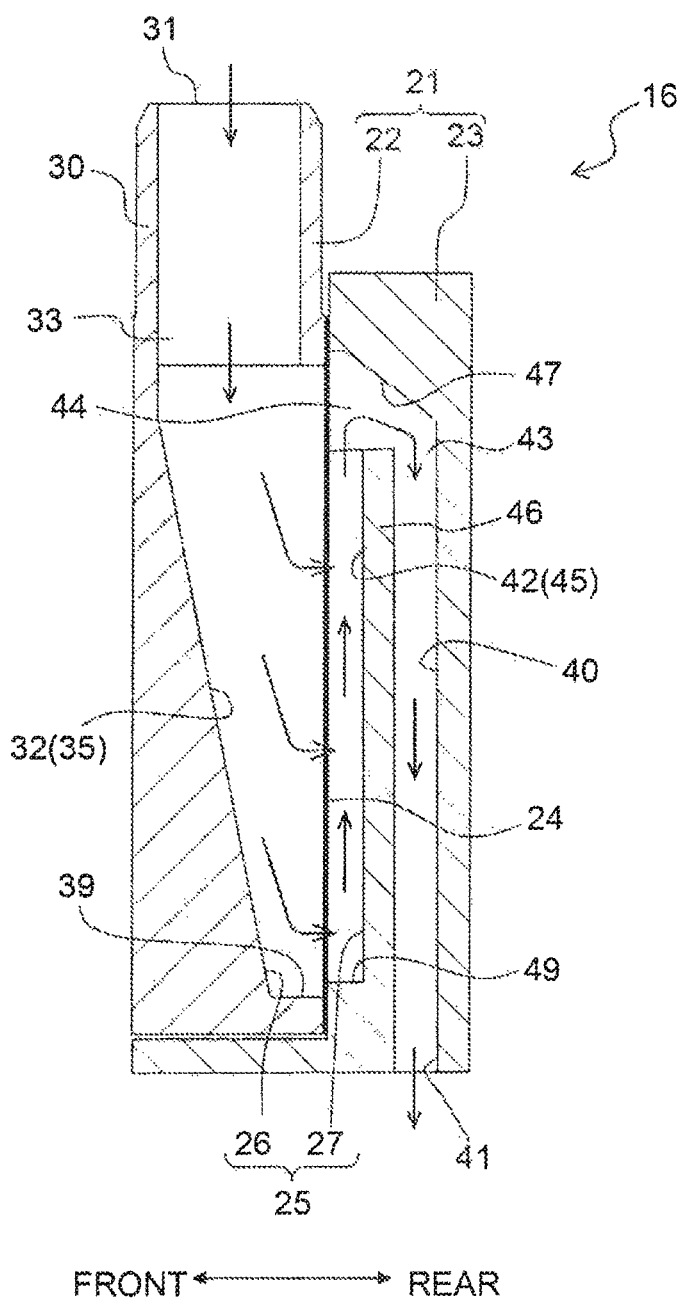
FIG. 6 is a cross-sectional view of the filter unit.

The upstream member 22 and the downstream member 23 configuring the liquid chamber forming member 21 are both substantially rectangular plate-like resin members, and are each formed by injection molding. As depicted in FIGS. 4 to 6, the upstream member 22 and the downstream member 23 are disposed aligned to front and rear, and are joined in a state of a filter being interposed between the two. Four of the liquid chambers 25 respectively corresponding to the four colors of inks are formed aligned in the nozzle row direction, between the upstream member 22 and the downstream member 23. Note that in the present embodiment, the four liquid chambers 25 are all formed in an identical shape.

The filter 24 is disposed between the upstream member 22 and the downstream member 23, such that a surface direction of the filter 24 lies along the up-down direction and a nozzle arrangement direction. As depicted in FIG. 6, one liquid chamber 25 formed between the upstream member 22 and the downstream member 23 is partitioned into an upstream chamber 26 within the upstream member 22 and a downstream chamber 27 within the downstream member 23, by this filter 24. Note that a direction parallel to the nozzle row direction (left-right direction), of directions parallel to the surface direction of the filter 24 is defined particularly as a "filter width direction", and will be used appropriately in the description below.

Next, detailed structures of each of the upstream member 22, the downstream member 23, and the filter 24 that configure the filter unit 16, will be described in order.

<Upstream Member>

As depicted in FIGS. 6 to 9, the four cylindrical ink supply sections 30 are disposed at intervals in the nozzle row direction, in an upper section of the upstream member 22. An upper end of the ink supply section 30 is an ink inlet port 31 into which ink flows from the unillustrated ink tank. In a surface facing the downstream member 23, of the upstream member 22, four recessed sections 32 are respectively formed in positions directly below the four ink supply sections 30, and the four recessed sections 32 are aligned in the nozzle row direction. A space within each of the recessed sections 32 represents the upstream chamber 26 positioned more to an upstream side than the filter 24 in a supply direction of the ink. The upstream chamber 26 has a vertically long shape whose length in the up-down direction is larger compared to its length in the filter width direction.

An inflow port 33 communicating with the ink inlet port 31 directly above it is formed in a central section in the filter width direction (left-right direction), of an upper end section of one recessed section 32. Moreover, two side wall surfaces 34 forming an upper end section of the upstream chamber 26, of an inner surface of the recessed section 32 are disposed sandwiching the inflow port 33 in the filter width direction. Furthermore, the two side wall surfaces 34 extend inclining inwardly with respect to the up-down direction so as to come closer to the inflow port 33 in the filter width direction upwardly. That is, the upper end section of the upstream chamber 26 is formed in a tapered shape tapering off in an upward direction, and a flow path width of the upstream chamber 26 in the filter width direction decreases upwardly.

In addition, a facing wall surface 35 facing the filter 24 sandwiching the upstream chamber 26, of the inner surface of the recessed section 32 extends along the up-down direction. However, the facing wall surface 35 is not completely parallel to the up-down direction, and inclines with respect to the up-down direction such that its distance from the filter 24 decreases with increasing downward location.

Figure 4B:
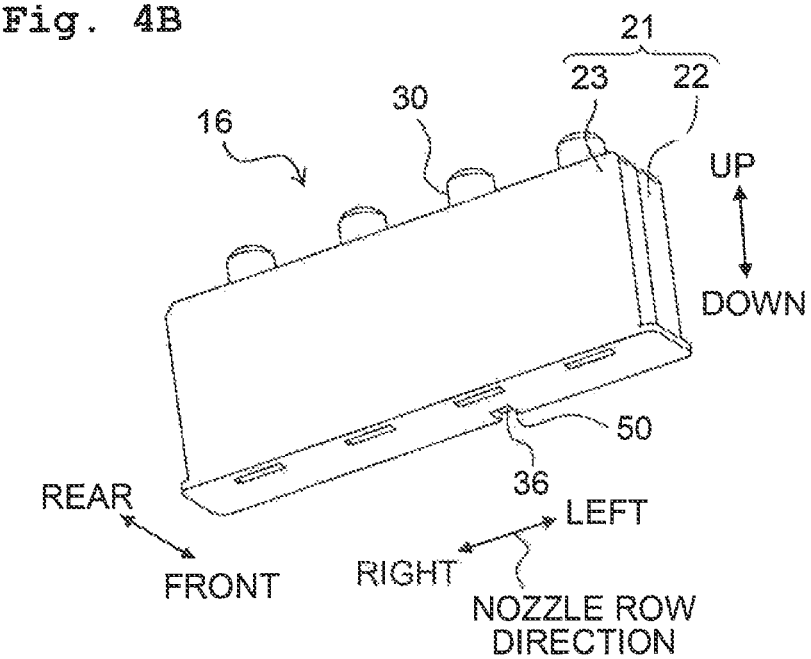
FIG. 4B is a perspective view of the filter unit seen from a rear obliquely downward direction.
Figure 7A:
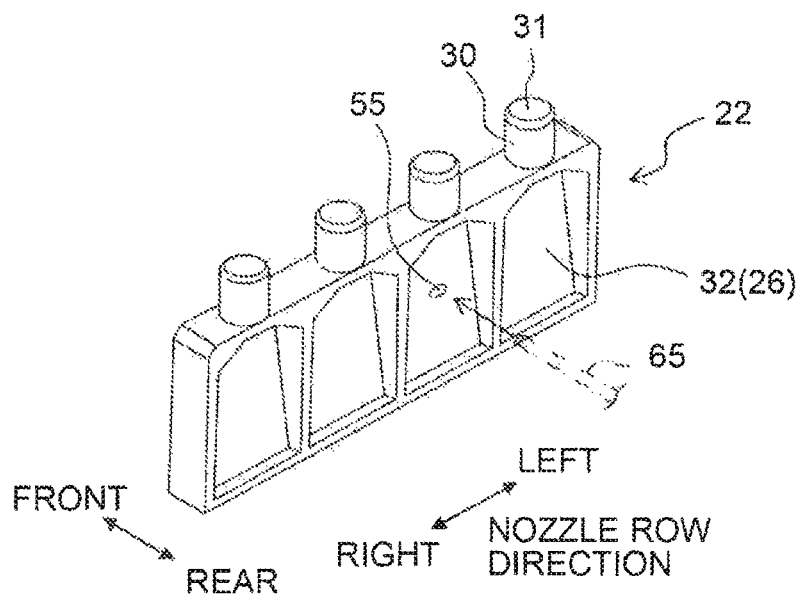
FIG. 7A is a perspective view of an upstream member seen from a side of its joining surface with a downstream member.
Figure 7B:
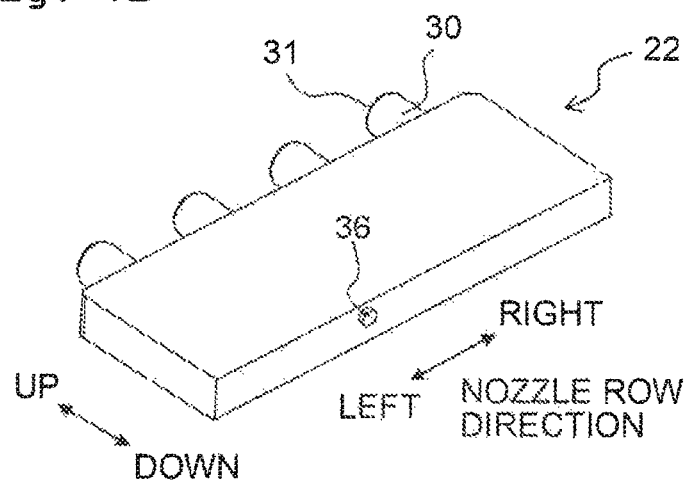
FIG. 7B is a perspective view of the upstream member seen from its bottom surface and front surface sides.
Figure 8A:
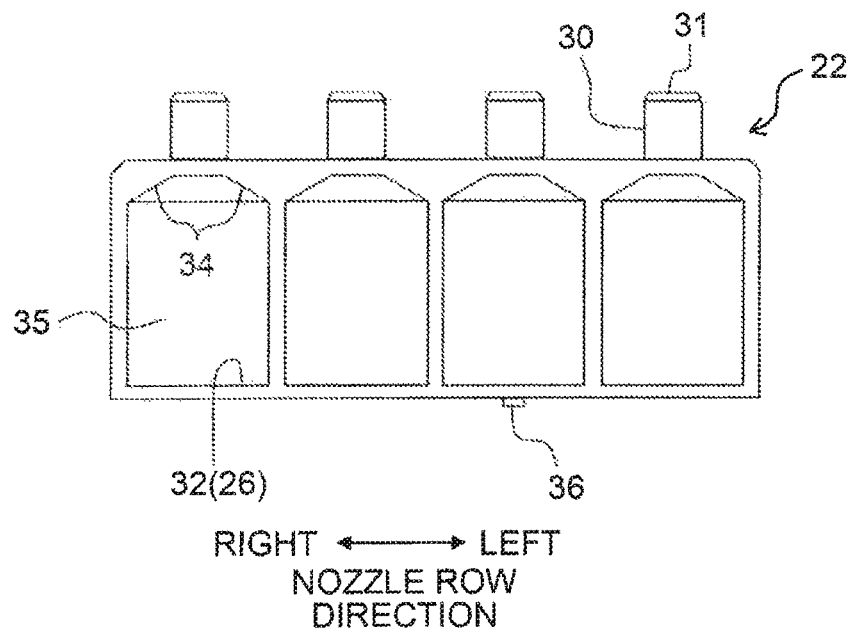
FIG. 8A is a view of the upstream member seen from its rear side.
Figure 8B:
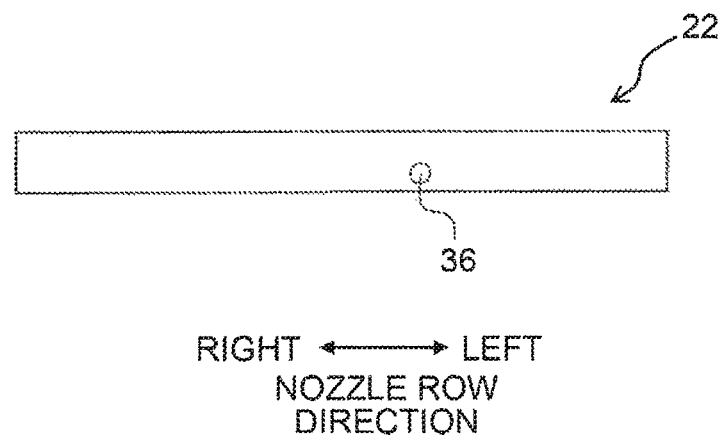
FIG. 8B is a bottom view of the upstream member.

As depicted in FIGS. 4B, 7B, and 8B, an engaging projecting section 36 that engages with a cutout section 50 of the next-mentioned downstream member 23 is formed in a central section in the nozzle row direction, of a lower end surface of the upstream member 22. In more detail, the engaging projecting section 36 is disposed in a position overlapping upwardly/downwardly the second from left upstream chamber 26, of the four upstream chambers 26.

<Downstream Member>

As depicted in FIGS. 6, and 10 to 12, the downstream member 23 includes: a rectangular main body section 23*a*; and a supporting wall section 23*b* coupled to a lower section of the main body section 23*a*.

Four recessed sections 42 aligned in the nozzle row direction are formed in a surface facing the upstream member 22, of the main body section 23*a*. When the upstream member 22 and the downstream member 23 are joined sandwiching the filter 24, the four recessed sections 42 of the downstream member 23 respectively face the four recessed sections 32 of the upstream member 22. At this time, one liquid chamber 25 is formed by the recessed section 32 of the upstream member 22 and the recessed section 42 of the downstream member 23. Moreover, a space within one recessed section 42 of the downstream member 23 represents the downstream chamber 27 positioned more to a downstream side than the filter 24 in the supply direction of the ink. The downstream chamber 27 also has a vertically long shape whose length in the up-down direction is larger than its length in the filter width direction, similarly to the upstream chamber 26.

As depicted in FIGS. 6 and 12, a discharge flow path 40 partitioned off from the downstream chamber 27 by a wall section 46 extends in the up-down direction on a back side of each of the recessed sections 42, of the downstream member 23. A discharge port 43 joined to the discharge flow path 40 is formed in an upper end section of the downstream chamber 27. Moreover, as depicted in FIGS. 4B, 10B, and 11B, four ink outlet ports 41 corresponding to the four recessed sections 42 are formed aligned in the nozzle row direction, in a lower surface of the supporting wall section 23*b*. As depicted in FIG. 6, each of the ink outlet ports 41 is joined to a lower end of the discharge flow path 40. As a result, the downstream chambers 27 formed within the four recessed sections 42 respectively communicate with the four ink outlet ports 41 via the discharge port 43 and the discharge flow path 40.

A specific structure of the upper end section of the downstream chamber 27 will be described in more detail. First, as depicted in FIGS. 6 and 12, the discharge port 43 is disposed in a central section in the filter width direction, of the upper end section of the downstream chamber 27. Two side wall surfaces 44 forming the upper end section of the downstream chamber 27, of an inner surface of the recessed section 42 are disposed sandwiching the discharge port 43 in the filter width direction. These two side wall surfaces 44 extend inclining inwardly with respect to the up-down direction so as to come closer to the discharge port 43 in the filter width direction upwardly. That is, the upper end section of the downstream chamber 27 is formed in a tapered shape tapering off in an upward direction, and a flow path width of the downstream chamber 27 in the filter width direction decreases upwardly.

Note that in relation to the up-down direction, the discharge port 43 is not at an upper end position of the downstream chamber 27, but is in a position slightly more downward than this upper end position. Specifically, the discharge port 43 is at a lower end position of the side wall surface 44.

In relation to a depth direction of the recessed section 42 orthogonal to the filter width direction and the up-down direction, the upper end section of the downstream chamber 27 penetrates more deeply than the wall section 46. Moreover, an inner wall surface 47 of an inner surface forming the upper end section of the downstream chamber 27 is formed in a shape such that it becomes easy for ink within the downstream chamber 27 to flow into the discharge port 43 at the back. Note that the "inner wall surface 47" refers to a surface that extends along the surface direction of the filter 24 and is coupled to the two side wall surfaces 44 at both ends in the filter width direction.

Figure 12A:
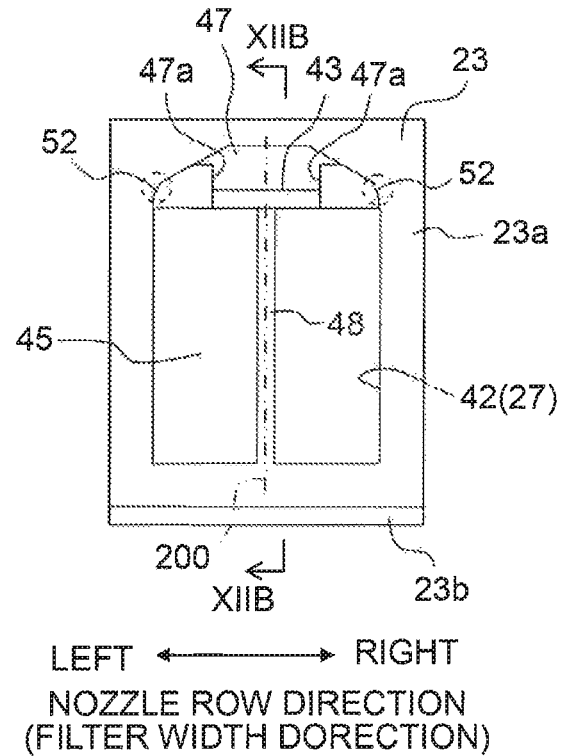
FIG. 12A is an enlarged view of a part of the downstream member.
Figure 12B:
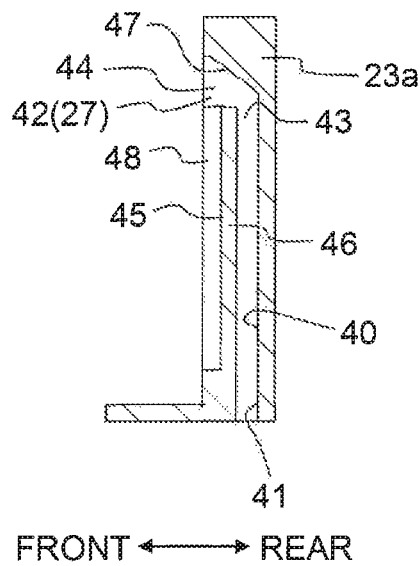
FIG. 12B is a cross-sectional view taken along the line XIIB-XIIB of FIG. 12A.

That is, as depicted in FIG. 12A, portions more to an outer side than the discharge port 43 in the filter width direction, of the inner wall surface 47 are formed in a shape more deeply located (more separated from the filter 24) with increasing closeness to the discharge port 43. Specifically, in FIG. 12A, two step sections 47a are formed in the inner wall surface 47, such that a central section in the filter width direction of the inner wall surface 47 will be in a deeper position than end sections in the filter width direction of the inner wall surface 47. Note that instead of the step sections 47a, end side portions in the filter width direction of the inner wall surface 47 may be inclined more to the depth side with increasingly central location. Moreover, as depicted in FIGS. 6 and 12B, a portion positioned more upwardly than the discharge port 43, of the inner wall surface 47 configures an inclined surface that inclines so as to be more downwardly located with increasing depth side location. This makes it easy for an air bubble guided to the upper end section of the downstream chamber 27 to flow into the discharge port 43.

As depicted in FIGS. 6 and 12B, a facing wall surface 45 facing the filter 24 sandwiching the downstream chamber 27, of the inner surface of the recessed section 42 extends in the up-down direction. A projecting section 48 extending in the up-down direction is formed in a central section in the filter width direction of this facing wall surface 45. The projecting section 48 is disposed on an imaginary straight line 200 passing through the discharge port 43 and extending in the up-down direction. Moreover, the projecting section 48 extends from a lower end of the downstream chamber 27 to a position of the discharge port 43 formed in the upper end section of the downstream chamber 27. In other words, the downstream chamber 27 is divided into two cells to left and right, by the projecting section 48 long upwardly/downwardly disposed in the central section in the filter width direction.

Note that as depicted in FIG. 6, a depth of the recessed section 42 forming the downstream chamber 27 is shallower than that of the recessed section 32 forming the upstream chamber 26, over the up-down direction. In the present embodiment, the facing wall surface 35 of the upstream chamber 26 is inclined, and a flow path cross-sectional area of the upstream chamber 26 is configured to be smaller with increasing downward location. Nevertheless, area of a bottom surface 39 of the upstream chamber 26 is configured to be larger than area of a bottom surface 49 of the downstream chamber 27. Moreover, the bottom surface 39 of the upstream chamber 26 is positioned more downwardly than the bottom surface 49 of the downstream chamber 27.

The supporting wall section 23b is coupled to a lower end of the main body section 23a and projects horizontally (in the front-rear direction) from the main body section 23a. The two members 22, 23 are joined in a state that the upstream member 22 is placed on this supporting wall section 23b and a lower end surface of the upstream member 22 is covered by the supporting wall section 23b. Moreover, the cutout section 50 is formed in the supporting wall section 23b, and this cutout section 50 engages with the engaging projecting section 36 formed on the lower end surface of the upstream member 22. The cutout section 50 is formed in a central section in the nozzle row direction corresponding to the engaging projecting section 36. Specifically, the cutout section 50 is disposed in a position overlapping upwardly/downwardly the second from left downstream chamber 27, of the four downstream chambers 27. By the engaging projecting section 36 of the upstream member 22 and the cutout section 50 of the downstream member 23 engaging, positional misalignment of the two members 22, 23 during joining of the two is prevented.

<Filter>

As depicted in FIGS. 5 and 6, the filter 24 is disposed in a posture that its surface direction is parallel to the up-down direction, between the upstream member 22 and the downstream member 23. The liquid chamber 25 between the two members is divided into the upstream chamber 26 and the downstream chamber 27, by this filter 24. Note that in the present embodiment, one filter 24 is employed with respect to the four liquid chambers 25, but the filter 24 may be divided into four filters respectively corresponding to the four liquid chambers 25. In each of the liquid chambers 25, the filter 24 extends from a lower end to an upper end of the liquid chamber 25. In other words, the upstream chamber 26 and the downstream chamber 27 are completely partitioned by the filter 24.

A kind of the filter 24 is not particularly limited, but an electroformed filter can be suitably adopted. An electroformed filter refers to a filter manufactured by electroforming technology depositing a metal ion on a base material. Electroforming is a method suitable for making a small-sized lightweight component, and an electroformed filter is suitable when a small thin filter is required.

The electroformed filter is generally manufactured by way of the following steps.

(1) Forming in a surface of the base material a resist pattern corresponding to a pattern of holes of the filter 24.
(2) Depositing a metal in a region not covered by the resist, of the base material (electroforming).
(3) Peeling the resist from the base material. As a result, the filter 24 in which holes are opened in the region not covered by the resist, is formed.

Incidentally, in the above-described step (1), first, having thoroughly formed a resist film on the surface of the base material, patterning is performed by an etching liquid after exposure. The resist after patterning has been performed by etching generally has a tapered cross-sectional shape. Therefore, as depicted in FIG. 13, a hole 24a of the filter 24 formed after peeling of the resist will also be a tapered hole whose hole diameter is smaller with increasing location in one thickness direction orthogonal to the surface direction of the filter 24. In this case, the filter 24 is preferably disposed such that a small diameter side of the hole 24a faces the upstream chamber 26. This makes it easy for small contaminants that have flowed into the upstream chamber 26 also to be captured by the filter 24.

<Regarding Purge>

Incidentally, besides the contaminants removed by the filter unit 16, an air bubble may also exist in the ink supplied from the ink tank. For example, when the ink tank is a replaceable ink cartridge, a large air bubble sometimes flows into the ink flow path during replacement of the ink cartridge. If this air bubble flows into the jetting unit 15 via the filter unit 16 and the distribution unit 17, a non-discharging state where ink cannot be discharged from the nozzle 10 may occur. Accordingly, the printer 1 of the present embodiment includes a purge apparatus 6 that discharges an air bubble in the ink by forcibly discharging ink from the plurality of nozzles 10 of each of the ink jet modules 11.

Figure 14:
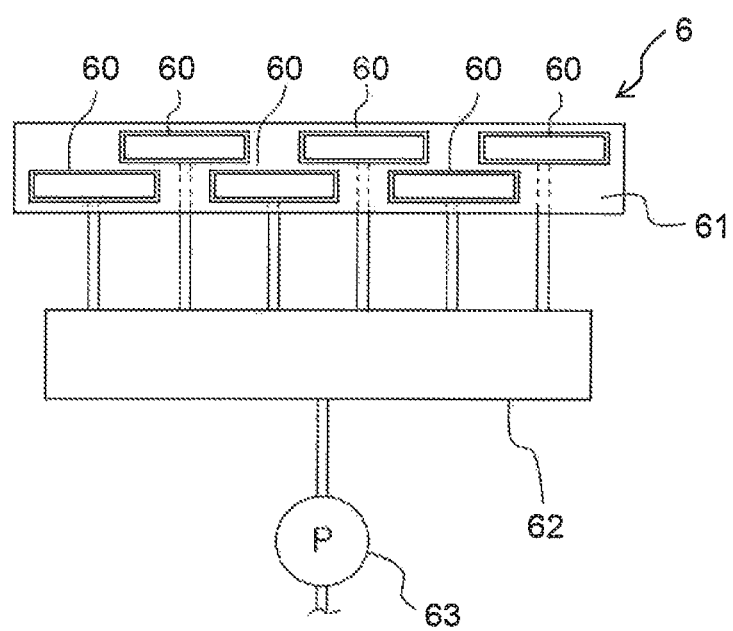
FIG. 14 is a view depicting a schematic configuration of a purge apparatus.

A configuration of the purge apparatus 6 is not particularly limited, but, for example, a configuration like that of FIG. 14 may be adopted. The purge apparatus 6 of FIG. 14 includes, for example: six caps 60 respectively corresponding to the six ink jet modules 11; a cap holder 61 that holds the six caps 60; and a suction pump 63 connected, via a switching apparatus 62, to the cap holder 61.

The cap holder 61 is configured to be movable between a suction position where each of the caps 60 contacts the jetting unit 15 of the ink jet module 11 and a standby position where each of the caps 60 is separated from the jetting unit 15, by being driven by an unillustrated drive mechanism. In a state where the cap holder 61 is in the suction position, the plurality of nozzles 10 of the jetting unit 15 are covered by the cap 60 and an airtight space is formed between the cap 60 and the jetting unit 15. Moreover, the switching apparatus 62 communicates the cap 60 corresponding to the specific ink jet module 11 that will be a purge target, of the six caps 60, with the pump 63.

When the suction pump 63 is driven in a state where the cap 60 covers the nozzle 10 of the jetting unit 15 and one cap 60 and the suction pump 63 are communicated by the switching apparatus 62, a negative pressure occurs within the airtight space within the above-described one cap 60, and ink is forcibly discharged from the nozzle 10 of the jetting unit 15 (suction purge). As a result, an air bubble existing in the ink flow path within the jetting unit 15 is discharged, along with the ink, from the nozzle 10.

When ink is discharged from the nozzle 10 of the jetting unit 15 by the above-described purge, a flow of ink like that indicated by the arrows in FIG. 6 occurs in the filter unit 16 more to the upstream side than the jetting unit 15. First, ink from the ink tank flows into the ink inlet port 31. This ink flows into the upstream chamber 26 from the inflow port 33 and passes through the filter 24 to flow into the downstream chamber 27. The ink of the downstream chamber 27 flows from the discharge port 43 in an upper end section, via the discharge flow path 40, to the ink outlet port 41. It is desired that at this time, an air bubble existing within the filter unit 16 is effectively discharged by the flow that has occurred within the filter unit 16.

Figure 10A:
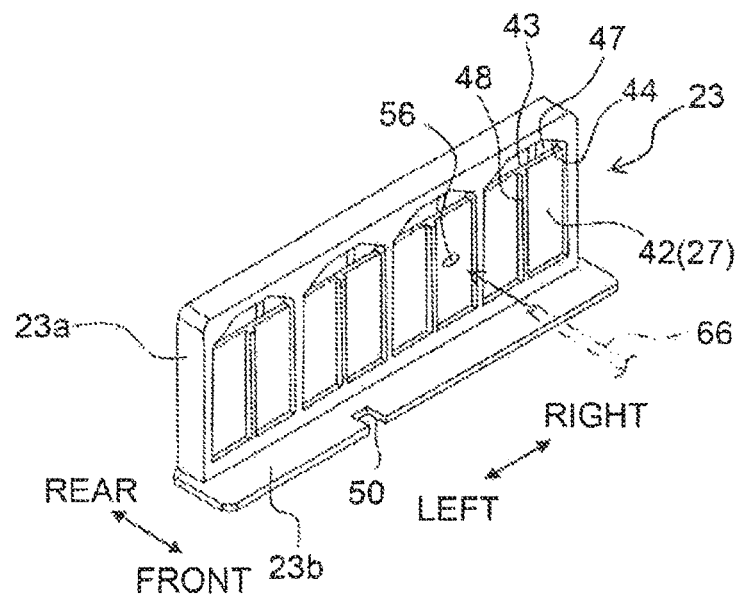
FIG. 10A is a perspective view of a downstream member seen from a side of its joining surface with the upstream member.
Figure 10B:
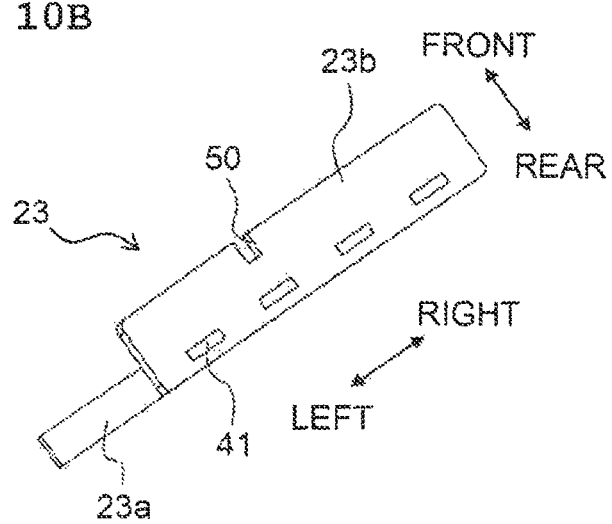
FIG. 10B is a perspective view of the downstream member seen from its bottom surface side.
Figure 11A:
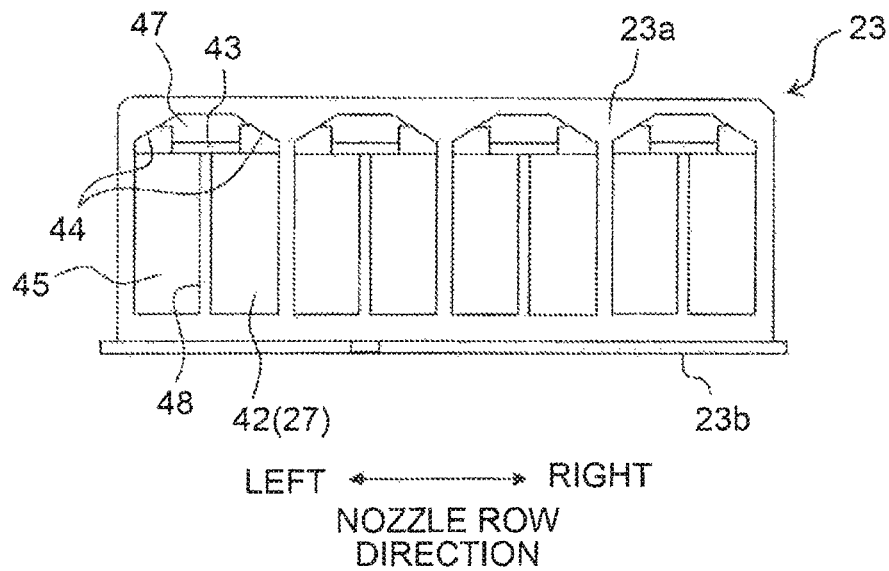
FIG. 11A is a view of the downstream member seen from its front side.
Figure 11B:
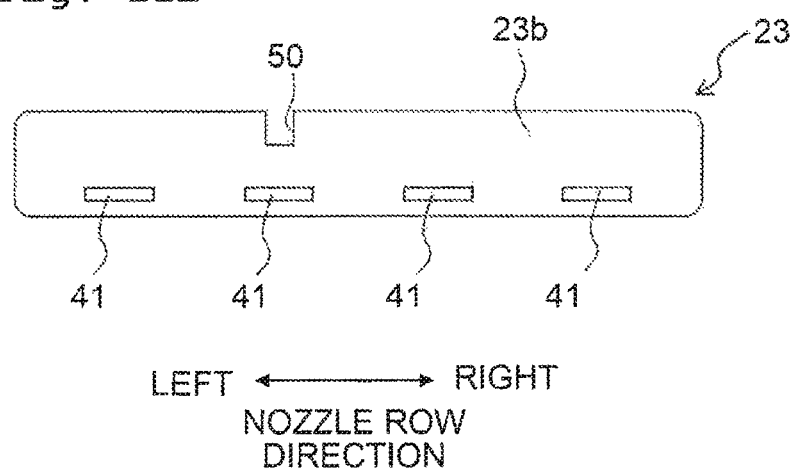
FIG. 11B is a bottom view of the downstream member.

In this regard, in the present embodiment, as depicted in FIGS. 10 to 12, in the downstream chamber 27 of the filter unit 16, the two side wall surfaces 44 forming the upper end section of the downstream chamber 27 extend inclining so as to come closer to the discharge port 43 in the filter width direction upwardly. As a result, an air bubble within the downstream chamber 27 is guided to the discharge port 43 by the two side wall surfaces 44. Therefore, it becomes easy for an air bubble within the downstream chamber 27 to be discharged from the discharge port 43 during purge, and it becomes difficult for air bubbles to collect in the downstream chamber 27. Moreover, a flow speed of ink within the downstream chamber 27 increases due to the upper end section of the downstream chamber 27 having a flow path width that decreases upwardly, and this also results in an air bubble discharge effect increasing.

Moreover, end side portions in the filter width direction, of the inner wall surface 47 forming the upper end section of the downstream chamber 27 are shaped penetrating to a depth side so as be more separated from the filter 24 with increasing closeness to the centrally-located discharge port 43. In this configuration, an air bubble of the downstream chamber 27 is guided upwardly by the two side wall surfaces 44, and further guided to the discharge port 43 at a center in the filter width direction, by the inner wall surface 47. Therefore, it becomes even easier for an air bubble to be discharged.

In order for an air bubble staying within the downstream chamber 27 to be more effectively discharged by the purge, a corner of the upper end section of the downstream chamber 27 is preferably formed in a curved surface. Note that a corner refers to a coupling section of the side wall surface 44 and another surface forming the downstream chamber 27 (for example, the likes of a wall surface extending upwardly/downwardly or the inner wall surface 47). FIG. 12 depicts as an example a corner 52 (a portion surrounded by a circle) between the side wall surface 44 and the wall surface extending upwardly/downwardly.

Figure 9A:
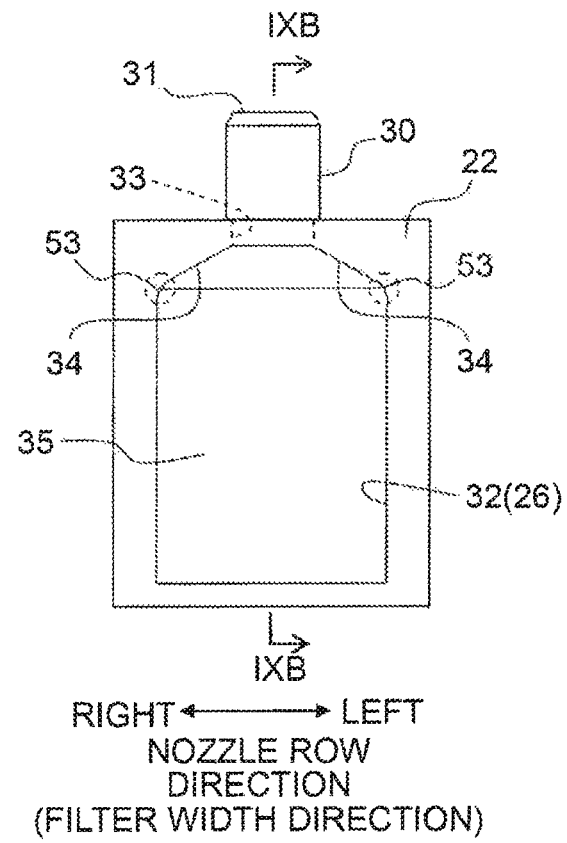
FIG. 9A is an enlarged view of a part of the upstream member.
Figure 9B:
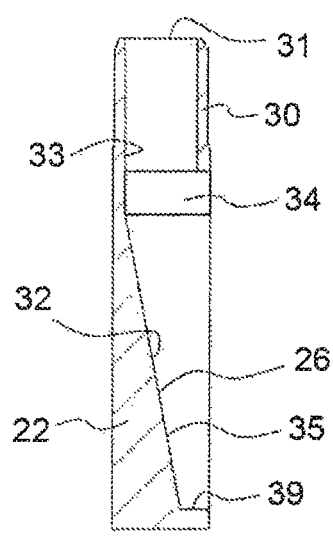
FIG. 9B is a cross-sectional view taken along the line IXB-IXB of FIG. 9A.

As depicted in FIGS. 7 to 9, in the upstream chamber 26 also, the two side wall surfaces 34 extend inclining so as to come closer to the inflow port 33 in the filter width direction upwardly. Therefore, it becomes easy for an air bubble within the upstream chamber 26 to be discharged to an upstream side from the inflow port 33, and it becomes difficult for air bubbles to collect in the upstream chamber 26. Moreover, in the upstream chamber 26 also, similarly to in the downstream chamber 27, a corner 53 is preferably formed in a curved surface as in FIG. 9.

As depicted in FIGS. 10 to 12, due to the projecting section 48 being formed in the facing wall surface 45 of the downstream chamber 27, the filter 24 is prevented from sticking to the facing wall surface 45. Moreover, this projecting section 48 functions also as a means for guiding an air bubble within the downstream chamber 27 to the discharge port 43. That is, because the projecting section 48 extends in the up-down direction, it becomes easy for an air bubble within the downstream chamber 27 to flow upwardly along the projecting section 48. Moreover, because the projecting section 48 is disposed on the imaginary straight line 200 passing through the discharge port 43 and extending in the up-down direction, it becomes easy for an air bubble to be guided to the discharge port 43. Furthermore, the projecting section 48 extends from the lower end of the downstream chamber 27 to a position of the discharge port 43 formed in the upper end section of the downstream chamber 27. Therefore, it becomes easy for an air bubble staying in the lower end section of the downstream chamber 27 also to be guided to the discharge port 43 upward of it along the projecting section 48.

The contaminants in the ink captured by the filter 24 attach to a surface on an upstream chamber 26 side of the filter 24. However, some of the foreign bodies peel off and drop from the filter 24 due to a flow of ink within the upstream chamber 26, and collect in the bottom surface 39 of the upstream chamber 26. At this time, the greater the amount of foreign bodies that drop is, the more clogging of the filter 24 is suppressed. However, if an area of the bottom surface 39 of the upstream chamber 26 is small, an area where the foreign bodies can accumulate becomes small. In this case, even if the contaminants drop from the filter 24, it ends up being immediately blown upwards by the flow of ink within the upstream chamber 26 and being captured again by the filter 24. In other words, from a viewpoint of suppressing clogging of the filter 24, the area of the bottom surface 39 of the upstream chamber 26 is preferably large in order that the foreign bodies that have dropped from the filter 24 are kept collected. Accordingly, in the present embodiment, as depicted in FIG. 6, the area of the bottom surface 39 of the upstream chamber 26 is configured larger than the area of the bottom surface 49 of the downstream chamber 27. Moreover, as depicted in FIG. 6, the bottom surface 39 of the upstream chamber 26 is positioned more downwardly than the bottom surface 49 of the downstream chamber 27. As a result, the flow of ink passing through the filter 24 is never hindered by the foreign bodies that have accumulated in the bottom surface 39 of the upstream chamber 26.

While the inflow port 33 is provided in the upper end section of the upstream chamber 26, the filter 24 is disposed in a posture of lying along the up-down direction. Therefore, ink that has flowed into the upstream chamber 26 from the inflow port 33 above changes its orientation by substantially 90 degrees within the upstream chamber 26 to pass through the filter 24. In other words, because orientation of the flow of ink within the upstream chamber 26 changes greatly, it is easy for the flow within the upstream chamber 26 to be disturbed. It is also conceivable that if the flow is greatly disturbed, the foreign bodies accumulating in the bottom surface 39 of the upstream chamber 26 are blown upwards and clogging of the filter 24 is promoted. In this regard, in the present embodiment, as depicted in FIG. 6, the facing wall surface 35 of the upstream chamber 26 inclines so as to come closer to the filter 24 downwardly. In this configuration, the orientation of the flow of supplied ink ends up changing gradually within the upstream chamber 26, and disturbance is suppressed. Moreover, it is also suppressed that the foreign bodies accumulating in the bottom surface 39 of the upstream chamber 26 get greatly blown upwards by the flow of ink.

In the present embodiment, the liquid chamber forming member 21 in which the liquid chamber 25 is formed, is configured by two members, that is, the upstream member 22 and the downstream member 23. Therefore, the members having a complicated flow path shape including the liquid chamber 25 can be easily formed by injection molding. Moreover, by sandwiching the filter 24 by the two members, the two liquid chambers (the upstream chamber 26 and the downstream chamber 27) separated by the filter 24 can be easily formed.

The engaging projecting section 36 is formed on the lower end surface of the upstream member 22, and the cutout section 50 that engages with the engaging projecting section 36 is formed in the downstream member 23. By engagement of the engaging projecting section 36 and the cutout section 50, positional misalignment between the upstream member 22 and the downstream member 23 during assembly of the filter unit 16 is prevented.

The upstream member 22 and the downstream member 23 are joined sandwiching the filter 24, in a state that the lower end surface of the upstream member 22 is covered by the supporting wall section 23*b*, and the engaging projecting section 36 of the upstream member 22 and the cutout section 50 of the downstream member 23 have been engaged. Now, it is preferable that the lower end surface of the upstream member 22 is not joined to the supporting wall section 23*b*, but that the upstream member 22 is joined to the downstream member 23 by a portion other than its lower end surface. The reason for this is as follows.

It is difficult for the supporting wall section 23*b* that has a comparatively large area, to be formed flat by injection molding, and substantial curvature occurs in it. If joining of the upstream member 22 is performed by such a supporting wall section 23*b*, then a posture of the upstream member 22 is unstable due to the curvature of the supporting wall section 23*b*, and there is risk of ink leakage from the liquid chamber 25 occurring due to the posture. In this regard, it is configured that in the supporting wall section 23*b*, the two members 22, 23 are merely engaged for prevention of positional misalignment, and that joining to the upstream member 22 is performed by the main body section 23*a* different from the supporting wall section 23*b*. As a result, the two members 22, 23 can be joined in a correct posture, and ink leakage from the liquid chamber 25 can be prevented.

The engaging projecting section 36 of the upstream member 22 and the cutout section 50 of the downstream member 23 are both disposed in a central section in the nozzle row direction of the liquid chamber forming member 21. Generally, when joining fellow members that are long in one direction, positioning is often performed in a central section in the longitudinal direction in order to reduce a misalignment amount in end sections. In this regard, in the present embodiment, since the engaging projecting section 36 and the cutout section 50 are positioned in the central section in the nozzle row direction, then in the case that the upstream member 22 and the downstream member 23 are joined undergoing positioning in their central sections in the nozzle row direction, a reference position of positioning of the two members 22, 23 and an engagement position of the engaging projecting section 36 and the cutout section 50 become close. As a result, since when the two members 22, 23 have undergone positioning in the central section, they are supported by engagement of the engaging projecting section 36 and the cutout section 50 right nearby them, it becomes difficult for positions of the two members 22, 23 to be misaligned during their joining.

Note that when the upstream member 22 and the downstream member 23 are formed by injection molding, a knockout pin for removing a member from a mold after molding is pressed against the member. As a result of a pressing force due to this knockout pin, a recessed section is formed locally in a portion pressed against by the pin. The following kind of problem may occur depending on a place where such a recessed section is formed.

For example, when the knockout pin is pressed against an outer surface of the upstream member 22 or the downstream member 23, unevenness gets caused in the above-described outer surface. In this case, there is a risk that in a configuration where another member such as the driver IC 20 is disposed on an outer surface of the filter unit 16 (refer to FIG. 3), the previously described other member rattles due to the unevenness of the outer surface and its position or posture becomes unstable. Moreover, if the knockout pin is pressed against a joining surface to each other of the two members 22, 23, then unevenness ends up being caused in the joining surface which is a main cause of a joining defect.

Accordingly, the portion pressed against by the knockout pin preferably exists in a portion forming an inner wall surface of the liquid chamber 25. Specifically, as depicted in FIG. 7, in the upstream member 22, a portion 55 pressed against by a knockout pin 65 exists in an inner wall surface of the upstream chamber 26. Moreover, as depicted in FIG. 10, in the downstream member 23, a portion 56 pressed against by a knockout pin 66 exists in an inner wall surface of the downstream chamber 27. Since the inner wall surface of the liquid chamber 25 is neither a surface where another member is disposed nor a surface joined to another member, no particular problem occurs even if a recessed section is formed by the knockout pin 65.

The four liquid chambers 25 respectively corresponding to the four colors of inks may each be formed by separate members, but in the present embodiment, the four liquid chambers 25 are provided altogether in one filter unit 16. In this case, the filter unit 16 and consequently the ink jet module 11 can be miniaturized. Note that the four liquid chambers 25 may also be aligned in the front-rear direction corresponding to the four nozzle rows 13 aligned in the front-rear direction (refer to FIG. 1), but in this configuration, a width in the front-rear direction of one ink jet module 11 ends up increasing. In this regard, in the present embodiment, the four liquid chambers 25 are aligned in the nozzle row direction. Therefore, the width in the front-rear direction orthogonal to the nozzle row direction, of the ink jet module 11 can be reduced.

In the embodiment described above, the ink-jet head 2 is an example of a "liquid jetting head" of the present teaching. The ink jet module 11 is an example of a "liquid jetting module" of the present teaching. The ink inlet port 31 is an example of a "liquid inlet port" of the present teaching, and the ink outlet port 41 is an example of a "liquid outlet port" of the present teaching. The side wall surface 44 of the downstream chamber 27 is an example of a "first side wall surface" of the present teaching, and the facing wall surface 45 is an example of a "first facing wall surface" of the present teaching. The side wall surface 34 of the upstream chamber 26 is an example of a "second side wall surface" of the present teaching, and the facing wall surface 35 is an example of a "second facing wall surface" of the present teaching. The engaging projecting section 36 of the upstream member 22 is an example of a "first engaging part" of the present teaching, and the cutout section 50 of the downstream member 23 is an example of a "second engaging part" of the present teaching. The driver IC 20 is an example of a "drive circuit" of the present teaching.

Next, modified examples where various changes have been made to the previously described embodiment will be described. However, configurations of the modified examples similar to those of the previously described embodiment will be assigned with the same symbols as those assigned in the previously described embodiment, and descriptions thereof will be appropriately omitted.

In the previously described embodiment, the surface direction of the filter 24 is parallel to the up-down direction (refer to FIG. 6). However, the surface direction of the filter may be slightly inclined with respect to the up-down direction (modified example 1).

Figure 15:
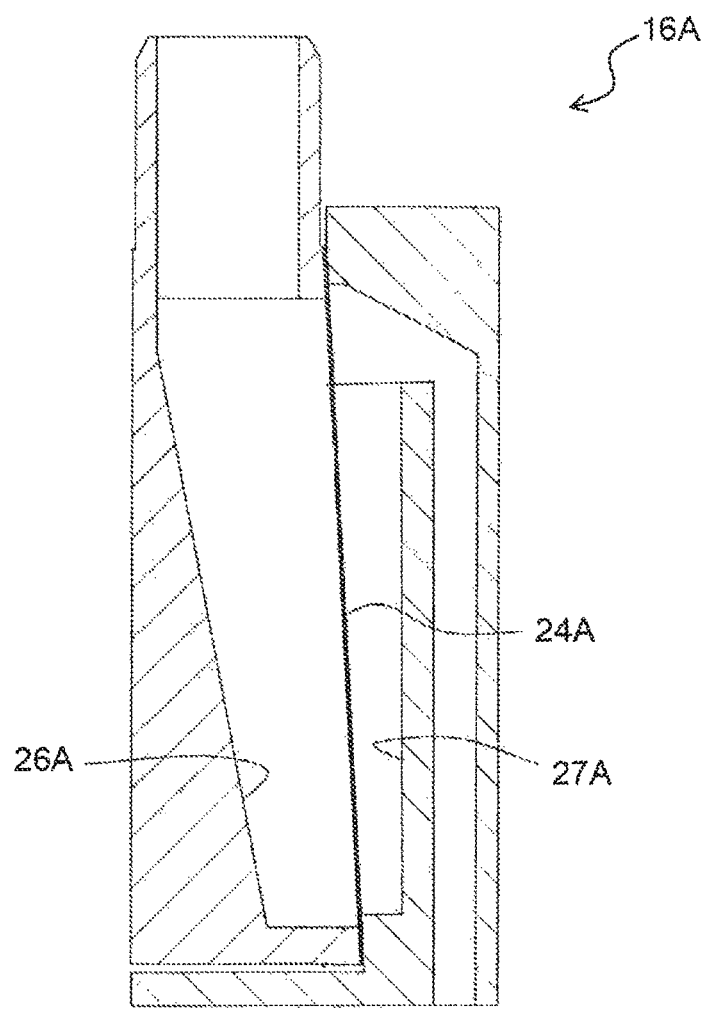
FIG. 15 is a cross-sectional view of a filter unit of modified example 1.

For example, in a filter unit 16A of FIG. 15, a filter 24A is disposed in a posture inclined to an upstream chamber side (a left side in the drawing) with respect to the up-down direction. In this configuration, it becomes easy for the contaminants attached to the filter 24A to drop due to the flow of ink within an upstream chamber 26A. Therefore, clogging of the filter 24A is suppressed. Note that from a viewpoint of promoting dropping of the contaminants, it is better for an inclination angle with respect to the up-down direction of the filter 24A to be large, but if this angle is too large, then the upstream chamber 26A and a downstream chamber 27A become large in the front-rear direction, and the filter unit 16A overall ends up increasing in size. Accordingly, the above-described inclination angle is preferably 10 to 15 degrees.

Although also mentioned previously, when some of the foreign bodies captured by the filter in the upstream chamber drop from the filter due to the flow of ink, these foreign bodies accumulate in the bottom surface of the upstream chamber. However, when contaminants that have once accumulated is blown upwards by the flow of ink within the upstream chamber, that contaminants end up attaching to the filter again, and clogging of the filter gets promoted. In other words, from a viewpoint of suppressing clogging of the filter, contaminants that have once dropped from the filter is preferably maintained in an accumulated state in the bottom surface of the upstream chamber.

Figure 16:
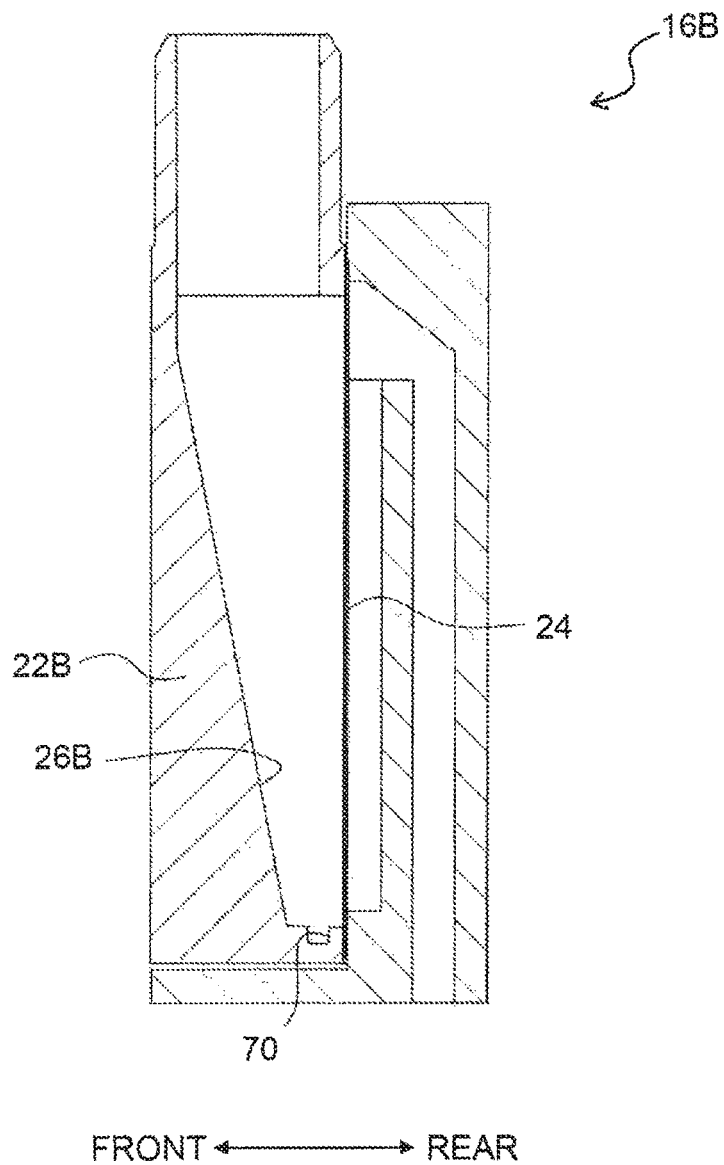
FIG. 16 is a cross-sectional view of a filter unit of modified example 2.

In this regard, in a filter unit 16B of FIG. 16, a groove 70 extending in the filter width direction (a direction perpendicular to the paper surface of FIG. 16) is formed in a lower end section of an upstream chamber 26B of an upstream member 22B (modified example 2). In this configuration, because the foreign bodies that have dropped from the filter 24 within the upstream chamber 26B collect in the groove 70 of the bottom surface of the upstream chamber 26B, it becomes difficult for the foreign bodies that have once dropped to be blown upwards by the flow of ink within the upstream chamber 26B. Moreover, since the groove 70 does not contact the filter 24 and is separated from the filter 24, it is difficult for the foreign bodies that have collected in the groove 70 to be blown upwards by the flow of ink in a vicinity of the filter 24.

In the case that the air bubble stays within the downstream chamber, particularly in the lower end section of the downstream chamber, when a length in the up-down direction of the downstream chamber is long, it is difficult for the above-described air bubble to be discharged from the discharge port even if the purge is performed. Accordingly, from this viewpoint, the length in the up-down direction of the downstream chamber is preferably short.

Figure 17:
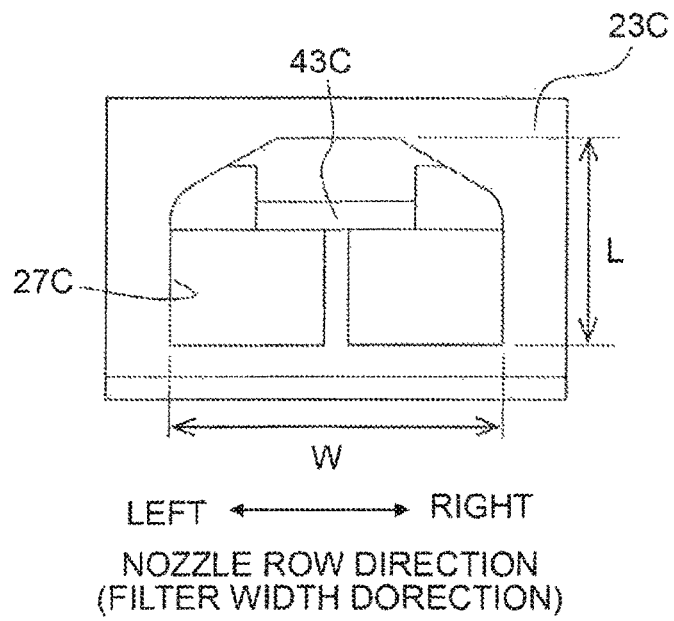
FIG. 17 is an enlarged view of a part of a downstream member of modified example 3.

In a downstream member 23C of FIG. 17, a length L in the up-down direction of a downstream chamber 27C is shorter than a length W in the filter width direction of the downstream chamber 27C (modified example 3). In this configuration, because a distance from the lower end section of the downstream chamber 27C to a discharge port 43C becomes shorter, it becomes easy to discharge the air bubble staying in the lower end section of the downstream chamber 27C.

In the previously described embodiment, the ink flow path including the likes of the liquid chamber 25 or the discharge flow path 40 within the filter unit 16, is configured in an identical shape for all four colors of inks. However, in the case that air bubble generation frequency differs depending on differences in the likes of a kind of ink or an environment of use, a required air bubble dischargeability will differ. Accordingly, the shape of the ink flow path may be made different according to the required air bubble dischargeability. Hereafter, description will be made giving the following two factors as examples of factors related to air bubble generation frequency, namely, (1) difference of ink kind, and (2) difference of quantity of heat that may be provided to the ink.

(Factor 1) Ink Kind

Ease of generation of an air bubble sometimes differs according to the kind of ink. For example, ease of dissolution of air in the ink sometimes differs according to ink kind. In this case, in ink having a large dissolved air amount, many air bubbles may be generated by an ink temperature rise.

Moreover, ease of entry of an air bubble from outside also sometimes differs according to frequency of use of the ink. For example, when the ink tank is a replaceable ink cartridge, it is easy for an air bubble to enter inside the ink flow path from outside during replacement of the ink cartridge. An ink having a high frequency of use has a high cartridge replacement frequency, hence an amount of air bubbles entering into the ink flow path in the case of that ink becomes larger compared to in the case of an ink having a low frequency of use. For example, if black and the three colors yellow, cyan, and magenta of color inks are compared, generally, a used amount of black ink is larger compared to that of the color inks. Therefore, the replacement frequency of a black cartridge becomes higher than those of the other inks, and it is easy for an air bubble to enter the black ink flow path. Accordingly, the shape of the ink flow path within the filter unit may be made different for an ink in which an air bubble is easily generated or into which an air bubble easily enters, and another ink.

Figure 18:
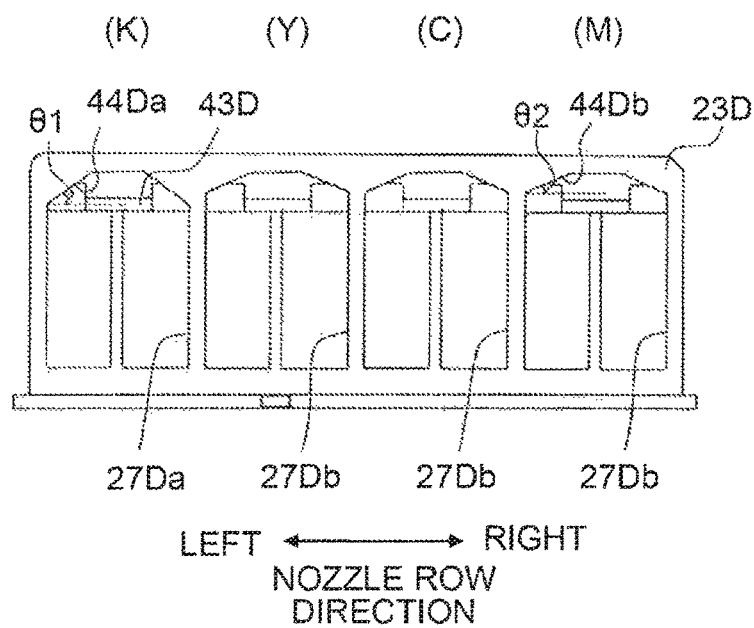
FIG. 18 is a view of a downstream member of modified example 4 seen from its front side.

For example, in a downstream member 23D of FIG. 18, an angle θ1 with respect to a horizontal direction of a side wall surface 44Da of a downstream chamber 27Da of black (K) is configured to be larger than an angle θ2 of side wall surfaces 44Db in downstream chambers 27Db of yellow (Y), cyan (C), and magenta (M) (modified example 4). In other words, a taper angle of the black side wall surface 44Da is made steep. As a result, in the black downstream chamber 27Da, the air bubble becomes more easily guided into the discharge port 43D compared to in those of the other three colors of color inks.

The angles θ1, θ2 should be determined in the following kind of range. When the angle θ2 of the side wall surface 44Db of the color inks has been set to 20°≤θ2≤30°, the angle θ1 of the side wall surface 44Da of the black ink should be set to 45°≤θ1≤60°. In order to increase air bubble dischargeability, the angle θ1 is preferably 45 degrees or more at which a length in a vertical direction of the side wall surface 44Da becomes larger than its length in a horizontal direction. However, if the angle becomes too large, the side wall surface 44Da comes close to a vertical surface and conversely air bubble dischargeability lowers, hence the angle θ1 is preferably not more than 60 degrees.

Moreover, as depicted in FIGS. 19A and 19B, in a filter unit 16E, a flow path cross-sectional area of a discharge flow path 40Ea joined to a downstream chamber 27Ea of black (K), formed in a downstream member 23E is configured to be smaller compared to those of discharge flow paths 40Eb of downstream chambers 27Eb of yellow (Y), cyan (C), and magenta (M) (modified example 5). Note that in FIGS. 19A and 19B, flow path widths in the front-rear direction are different for the discharge flow path 40Ea and the discharge flow path 40Eb, but flow path widths in the left-right direction (a direction perpendicular to the paper surface of FIGS. 19A and 19B) may be different. As a result, an ink flow speed within the discharge flow path 40Ea of black during purge increases, and it becomes easy for an air bubble within the downstream chamber 27Ea to be discharged.

Specific flow path cross-sectional areas of the discharge flow paths 40Ea, 40Eb are determined from various conditions including the likes of flow path conditions on a downstream side such as the numbers of nozzles of each of the colors of inks or conditions related to suction of the purge apparatus 6. For example, when the flow path cross-sectional area of the color discharge flow path 40Eb has been set to 2 to 5 mm², the flow path cross-sectional area of the black discharge flow path 40Ea should be set to not more than 1 mm².

Note that in order to increase air bubble dischargeability, the flow path cross-sectional area of the discharge flow path should be reduced, but if it is made too small, then particularly during high duty printing, ink supply to the jetting unit is delayed whereby negative pressure increases. As a result, it becomes easy for a meniscus break to occur in the nozzle 10. This occurs more easily in color ink frequently used in high duty printing such as photograph printing than in black ink frequently used in monochrome printing. In other words, in view also of another aspect of preventing occurrence of a meniscus break in high duty printing, the flow path cross-sectional area of the discharge flow path 40Eb of color ink should be larger than the flow path cross-sectional area of the black discharge flow path 40Ea.

(Factor 2) Quantity of Heat that May be Provided to Ink

The larger a quantity of heat provided to the ink from outside is, the easier it is for air dissolved in the ink to appear as an air bubble. Accordingly, when the quantity of heat provided from the outside differs among the inks respectively supplied to the four liquid chambers, shapes of the ink flow paths may be made different.

The driver IC connected to the jetting unit may be given as an example of a heat source generating heat provided to the ink. The driver IC generates heat when outputting the drive signal to the actuator of the jetting unit. At this time, there may occur a situation where the quantity of heat provided to the ink differs according to a positional relationship to the driver IC, among the four liquid chambers.

For example, in the previously described embodiment (refer to FIGS. 1 to 3), fellow end sections of each of two ink jet modules 11 aligned in the nozzle row direction overlap in the front-rear direction. In this configuration, the liquid chamber positioned on a nozzle row direction end side of the filter unit 16 of one ink jet module 11 has a distance from the driver IC 20 of an adjacent other ink jet module 11 which is closer compared to that of the liquid chamber in the central section of the filter unit 16 of the one ink jet module 11. Particularly, the driver IC 20 is provided on an inner wall surface in the front-rear direction in each of the ink jet modules 11. Therefore, a distance between the liquid chamber positioned on the nozzle row direction end side, of one ink jet module 11 and the driver IC 20 on an inner side of another ink jet module 11 is close, and a heating effect of that driver IC 20 is easily received. Therefore, a large quantity of heat is provided to the ink supplied to the end side liquid chamber, and an air bubble is easily generated in that ink.

Accordingly, in FIG. 20, an angle θ3 with respect to the horizontal direction of a side wall surface 44Fa, of a downstream chamber 27Fa on an end side in the nozzle row direction, of the four downstream chambers of a downstream member 23F is configured to be larger than an angle θ4 of a side wall surface 44Fb, of a downstream chamber 27Fb on a central side in the nozzle row direction, of the four downstream chambers of the downstream member 23F (modified example 6). That is, a taper angle of the side wall surface 44Fa on the end side is made steep. As a result, in the downstream chamber 27Fa on the end side, the air bubble becomes more easily guided into a discharge port 43F compared to in the downstream chamber 27Fb on the central side. Specific values of the angles θ3, θ4 should be determined similarly to in the case of the configuration of FIG. 18. That is, when the angle θ4 of the side wall surface 44Fb on the central side has been set to 20°≤θ4≤30°, the angle θ3 of the side wall surface 44Fa on the end side should be set to 45°≤θ3≤60°.

Note that in FIG. 20, the number of liquid chambers is four, but the number of liquid chambers may be five or more. In that case, the angles of the side wall surfaces with respect to the horizontal direction are preferably configured to be larger, the further a liquid chamber is located to an outer side of the filter width.

Figure 21A:
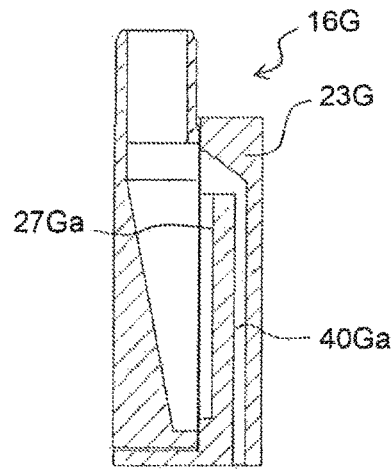
FIG. 21A is a cross-sectional view of a filter unit of modified example 7 depicting a cross section of an end side liquid chamber.
Figure 21B:
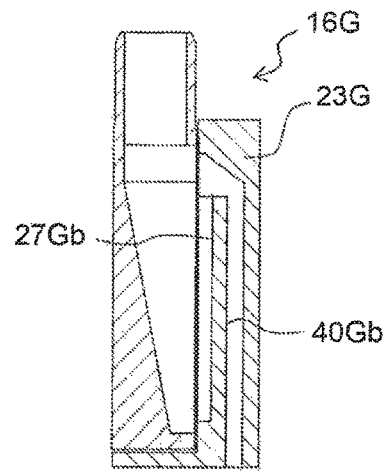
FIG. 21B is a cross-sectional view of the filter unit of modified example 7 depicting a cross section of a central side liquid chamber.

Moreover, as depicted in FIGS. 21A and 21B, in a filter unit 16G, a flow path cross-sectional area of a discharge flow path 40Ga joined to a downstream chamber 27Ga on the end side in the nozzle row direction, of the four downstream chambers formed in a downstream member 23G is configured to be smaller compared to that of a discharge flow path 40Gb of a downstream chamber 27Gb on the central side in the nozzle row direction, of the four downstream chambers formed in the downstream member 23G (modified example 7). As a result, an ink flow speed within the discharge flow path 40Ga during purge increases, and it becomes easy for an air bubble within the downstream chamber 27Ga on the end side to be discharged. Specific values of the flow path cross-sectional areas of the discharge flow paths 40Ga, 40Gb should be determined similarly to in the case of the configuration of FIGS. 19A and 19B. That is, when the flow path cross-sectional area of the discharge flow path 40Gb on the central side has been set to 2 to 5 mm$^2$, the flow path cross-sectional area of the discharge flow path 40Ga on the end side should be set to not more than 1 mm$^2$.

The likes of structure of the filter unit or its internal flow path shape are not limited to those of the previously described embodiment. For example, the following kinds of changes are possible.

Figure 22:
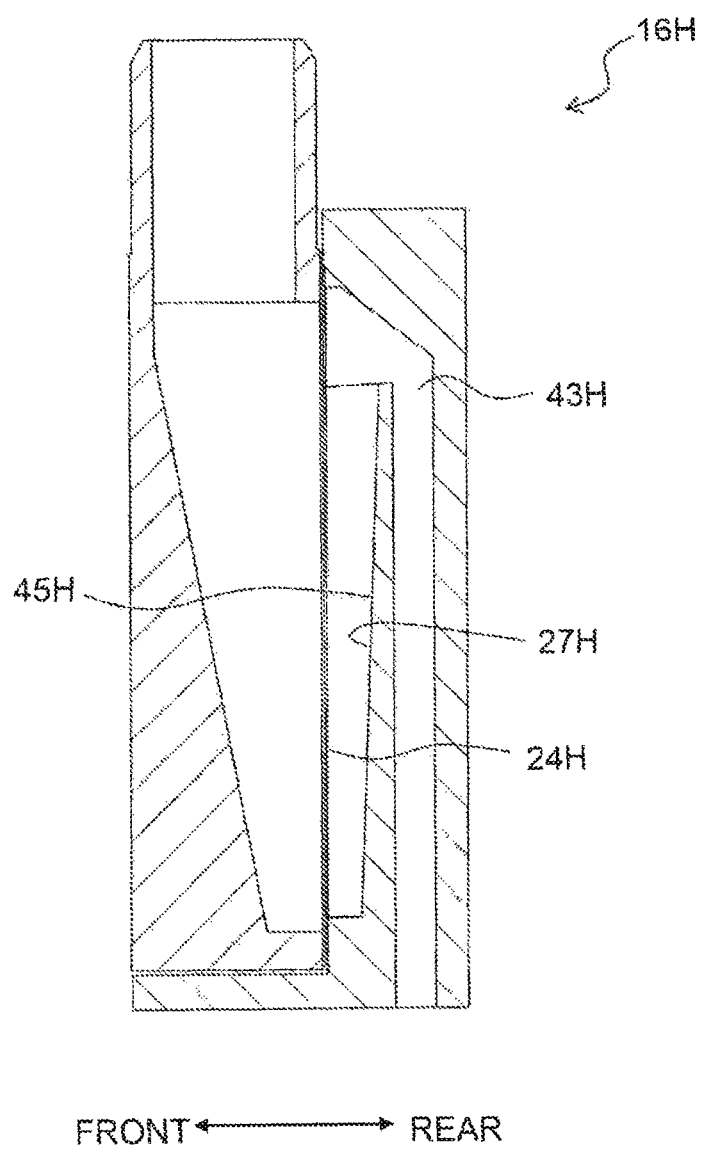
FIG. 22 is a cross-sectional view of a filter unit of modified example 8.

In FIG. 6 of the previously described embodiment, the facing wall surface 35 of the upstream chamber 26 is disposed inclined with respect to the up-down direction so as to come closer to the filter 24 downwardly. As a result, disturbance of the flow of ink within the upstream chamber 26 is suppressed, and the ink passes smoothly through the filter 24. Similar to this, a facing wall surface 45H of a downstream chamber 27H may also be disposed inclined with respect to the up-down direction, as in a filter unit 16H of FIG. 22 (modified example 8). That is, the facing wall surface 45H of the downstream chamber 27H may be disposed inclined so as be more separated from a filter 24H with increasing upward location. In this configuration, ink that has passed through the filter 24H to flow into the downstream chamber 27H gets easily guided to a discharge port 43H along the inclined facing wall surface 45H.

The ink inflow port of the filter unit is not required to be provided in the upper end section of the upstream member, and may be formed in, for example, the lower end section of the upstream member. Moreover, the ink outflow port of the filter unit is not required to be provided in the lower end section of the downstream member, and may be provided in, for example, the upper end section of the downstream member.

In the previously described embodiment and modified examples, the two members are joined in a state where the upstream member has been placed on the supporting wall section of the downstream member. However, it is possible for the supporting wall section to be provided on an upstream member side and for the downstream member to be placed on this supporting wall section. Moreover, it is not essential for a supporting wall section to be provided in one of the members, and there may be a configuration in which the two members are joined by their respective facing surfaces.

It is not essential for the liquid chamber forming member to be formed by two members, and it may be configured by one member, or may be configured by three or more members.

The embodiment and modified examples described above applied the present teaching to an ink-jet head which is one kind of liquid jetting head. However, it is possible for the present teaching to be applied also to a filter unit provided in an apparatus other than a liquid jetting head.

What is claimed is:

1. A filter unit comprising:
   a liquid chamber forming member having a liquid inlet port, a liquid outlet port, and a liquid chamber communicating with the liquid inlet port and the liquid outlet port; and
   a filter disposed in the liquid chamber in a posture that a surface direction of the filter lies along an up-down direction, the filter extending to an upper end of the liquid chamber, the filter dividing the liquid chamber into an upstream chamber communicating with the liquid inlet port and a downstream chamber communicating with the liquid outlet port,
   wherein a discharge port joined to the liquid outlet port is disposed in an upper end portion of the downstream chamber at a central portion in a width direction that is along the surface direction of the filter and orthogonal to the up-down direction,
   the liquid chamber forming member has two first side wall surfaces sandwiching the discharge port in the width direction, as wall surfaces forming the upper end portion of the downstream chamber,
   each of the two first side wall surfaces inclines with respect to the up-down direction to come closer to the discharge port upwardly, and
   a flow path width of the upper end portion of the downstream chamber in the width direction gradually decreases upwardly,
   wherein the liquid chamber forming member has a second facing wall surface forming the upstream chamber,
   the second facing wall surface faces the filter with the upstream chamber sandwiching therebetween,
   the second facing wall surface is inclined with respect to the up-down direction, and
   a distance from the filter to the second facing wall gradually decreases downwardly.

2. The filter unit according to claim 1,
   wherein the downstream chamber has corners where the two first side wall surfaces are coupled to another surface which is different from the two first side wall surfaces and which forms the downstream chamber, and
   each of the corners is formed in a curved shape.

3. The filter unit according to claim 1,
   wherein the liquid chamber forming member has an inner wall surface as a wall surface forming the upper end portion of the downstream chamber,
   the inner wall surface extends along the surface direction of the filter and is coupled to the two first side wall surfaces at both ends in the width direction,
   the inner wall surface has an outer portion which is outside the discharge port in the width direction, and
   a distance from the filter to the outer portion of the inner surface gradually increases toward the discharge port.

4. The filter unit according to claim 1,
   wherein an inflow port joined to the liquid inlet port is disposed in an upper end portion of the upstream chamber at a central portion in the width direction,
   the liquid chamber forming member has two second side wall surfaces sandwiching the inflow port in the width direction, as wall surfaces forming the upper end portion of the upstream chamber,
   each of the two second side wall surfaces inclines with respect to the up-down direction to come closer to the inflow port upwardly, and a flow path width of the upper end portion of the upstream chamber in the width direction gradually decreases upwardly.

5. The filter unit according to claim 1,
wherein the liquid chamber forming member has a first facing wall surface forming the downstream chamber,
the first facing wall surface faces the filter with the downstream chamber being sandwiched therebetween, and
a projection is formed in the first facing wall surface.

6. The filter unit according to claim 5, wherein the projection extends in the up-down direction.

7. The filter unit according to claim 6, wherein the projection is disposed on a virtual straight line passing through the discharge port and extending in the up-down direction.

8. The filter unit according to claim 6, wherein the projection extends to a position corresponding to the discharge port in the up-down direction.

9. The filter unit according to claim 8, wherein the projection extends to a lower end of the downstream chamber.

10. The filter unit according to claim 1, wherein a groove extending in the width direction is formed at a lower end portion of the upstream chamber of the liquid chamber forming member.

11. The filter unit according to claim 1, wherein the filter is disposed in a posture inclined to an upstream chamber side with respect to the up-down direction.

12. The filter unit according to claim 1, wherein an area of a bottom surface of the upstream chamber is larger than an area of a bottom surface of the downstream chamber.

13. The filter unit according to claim 1, wherein a length of the downstream chamber in the up-down direction is shorter than a width of the downstream chamber in the width direction.

14. The filter unit according to claim 1, wherein the liquid chamber forming member includes: an upstream member in which the upstream chamber is formed; and a downstream member in which the downstream chamber is formed.

15. The filter unit according to claim 14,
wherein a first engaging part is formed in one member of the upstream member and the downstream member, and
a second engaging part that engages with the first engaging part is formed in the other member of the upstream member and the downstream member.

16. The filter unit according to claim 15,
wherein the first engaging part is formed in a lower end surface of the one member,
the other member has a supporting wall extending in a horizontal direction and covering the lower end surface of the one member,
the supporting wall has the second engaging part formed therein, and
in a state that the lower end surface of the one member is placed on the supporting wall of the other member and the second engaging part engages with the first engaging part, the one member is joined to the other member at a portion other than the lower end surface.

17. The filter unit according to claim 15,
wherein the upstream member has an inner wall surface forming the upstream chamber,
the inner wall surface of the upstream member has a portion to be pressed by a knockout pin at a time of injection molding of the upstream member,
the downstream member has an inner wall surface forming the downstream chamber, and
the inner wall surface of the downstream member has a portion to be pressed by a knockout pin at a time of injection molding of the downstream member.

18. The filter unit according to claim 1, wherein the filter is an electroformed filter.

19. The filter unit according to claim 18,
wherein the filter has a plurality of holes,
each of the plurality of holes having a tapered shape in which a hole diameter decreases toward one side in a thickness direction orthogonal to the surface direction of the filter, and
the filter is disposed such that the hole diameter decreases toward the upstream chamber.

* * * * *